US012570769B2

(12) United States Patent
Shimura et al.

(10) Patent No.: US 12,570,769 B2
(45) Date of Patent: Mar. 10, 2026

(54) PARAMYLON-BASED RESIN, MOLDING MATERIAL, MOLDED BODY, AND PRODUCTION METHOD FOR PARAMYLON-BASED RESIN

(71) Applicants: NEC CORPORATION, Tokyo (JP); UNIVERSITY OF TSUKUBA, Tsukuba (JP)

(72) Inventors: Midori Shimura, Tokyo (JP); Shukichi Tanaka, Tokyo (JP); Masatoshi Iji, Ibaraki (JP)

(73) Assignees: NEC CORPORATION, Minato-ku (JP); UNIVERSITY OF TSUKUBA, Ibaraki (JP)

( * ) Notice: Subject to any disclaimer, the term of this patent is extended or adjusted under 35 U.S.C. 154(b) by 625 days.

(21) Appl. No.: 17/923,787

(22) PCT Filed: May 7, 2021

(86) PCT No.: PCT/JP2021/017596
§ 371 (c)(1),
(2) Date: Nov. 7, 2022

(87) PCT Pub. No.: WO2021/225172
PCT Pub. Date: Nov. 11, 2021

(65) Prior Publication Data

US 2023/0174681 A1 Jun. 8, 2023

(30) Foreign Application Priority Data

May 8, 2020 (JP) ................................ 2020-082878

(51) Int. Cl.
*C08B 37/00* (2006.01)

(52) U.S. Cl.
CPC ................................ *C08B 37/0024* (2013.01)

(58) Field of Classification Search
CPC ................................ C08B 37/0024; C08L 5/00
See application file for complete search history.

(56) References Cited

U.S. PATENT DOCUMENTS

| | | | | |
|---|---|---|---|---|
| 10,934,368 | B2 * | 3/2021 | Tanaka | C08B 3/16 |
| 2018/0044440 | A1 * | 2/2018 | Shibakami | C08B 37/0024 |

FOREIGN PATENT DOCUMENTS

| | | | | |
|---|---|---|---|---|
| EP | 2 921 504 | A1 | 9/2015 | |
| JP | 2017-101177 | A | 6/2017 | |
| JP | 2017-218566 | A | 12/2017 | |
| JP | 2018-141904 | A | 9/2018 | |
| WO | 2014/077340 | A1 | 5/2014 | |
| WO | WO-2017115634 | A1 * | 7/2017 | C08B 3/16 |
| WO | 2020/013232 | A1 | 1/2020 | |

OTHER PUBLICATIONS

Shibakami, Motonari et al., Heliyon, "Melt spinnabilities of thermoplastic paramylon mixed esters", 2019, vol. 5, pp. 1-13 (Year: 2019).*

Shibakami, Motonari et al., Journal of Polymers and the Environment, "Effects of Long-Chain Acyl Substituents on the Thermoplasticity and Mechanical Properties of Paramylon Mixed Esters", 2020, vol. 28, pp. 2263-2276 (Year: 2020).*

Extended European Search Report dated Feb. 13, 2024 in European Application No. 21800366.3.

Shibakami et al., "One-pot synthesis of thermoplastic mixed paramylon esters using trifluoroacetic anhydride", Carbohydrate Polymers, Nov. 24, 2014, vol. 119, pp. 1-7 (7 pages total).

Shibakami, Motonari et al., "Thermoplasticization of euglenoid β-1, 3-glucans by mixed esterification", Carbohydrate Polymers, 2014, pp. 90-96, vol. 105.

International Search Report of PCT/JP2021/017596 dated Jun. 29, 2021 [PCT/ISA/210].

* cited by examiner

*Primary Examiner* — Bahar Craigo
(74) *Attorney, Agent, or Firm* — Sughrue Mion, PLLC

(57) ABSTRACT

A paramylon-based resin excellent in mechanical characteristics and thermoplasticity is provided. The present embodiment provides a paramylon-based resin in which hydrogen atoms of hydroxy groups of paramylon are substituted by linear saturated aliphatic acyl group having 14 or more carbon atoms as a long chain component and/or acyl group having 2 or 3 carbon atoms (acetyl group or/and propionyl group) as a short chain component, wherein the paramylon has a weight average molecular weight in the range of more than 140000 to 220000 and a molecular weight distribution (weight average molecular weight/number average molecular weight) of 6.5 or less, a protein content of the paramylon is 0.22% by mass to 5.0% by mass, and a degree of substitution ($DS_{Lo}$) by the long chain component and a degree of substitution ($DS_{Sh}$) by the short chain component satisfy the following expressions (S1), (L1) and (T1); $1.7 \leq DS_{Sh} \leq 2.8$ (S1), $0 \leq DS_{Lo} \leq 0.4$ (L1), $2.1 \leq DS_{Lo}+DS_{Sh} \leq 2.8$ (T1).

15 Claims, No Drawings

PARAMYLON-BASED RESIN, MOLDING MATERIAL, MOLDED BODY, AND PRODUCTION METHOD FOR PARAMYLON-BASED RESIN

CROSS REFERENCE TO RELATED APPLICATIONS

This application is a National Stage of International Application No. PCT/JP2021/017596, filed May 7, 2021, claiming priority to Japanese Patent Application No. 2020-082878, filed May 8, 2020.

TECHNICAL FIELD

The present invention relates to a paramylon-based resin, a molding material, a molded body, and a production method for a paramylon-based resin.

BACKGROUND ART

Since bioplastics made from plant components as starting materials can contribute to measures against petroleum depletion or measures against global warming, their use in general products such as packages, containers, and fibers as well as durable products such as electronics and automobiles has also been started.

However, there is a demand for the development of novel bioplastics made from non-food plant components as starting materials due to concern about future food shortages, because usual bioplastics are made from edible components such as starch as starting materials.

Such a non-food plant component is typified by cellulose, which is a major component of wood or vegetation, and bioplastics obtained using this have been developed and partially commercialized.

Cellulose is obtained by removing lignin and hemicellulose contained in wood or the like using a drug. Alternatively, cotton substantially consists of cellulose and can therefore be used as it is. Cellulose is a polymer obtained through β-1,4 glucose polymerization and has no thermoplasticity because of having strong intermolecular force due to a hydrogen bond derived from hydroxy group. Also, cellulose has low solubility in solvents except for special solvents. Furthermore, cellulose is rich in hydroxy group, which is hydrophilic group, and therefore has high water absorbability and low water resistance.

Hence, the intermolecular force of cellulose is decreased by substituting hydrogen atoms of hydroxy groups of the cellulose by short chain acyl group such as acetyl group, and further, thermoplasticity is imparted thereto by the addition of a plasticizer. If thermoplasticity or water resistance is insufficient by using a short chain organic group such as acetyl group alone, a long chain organic group having a larger number of carbon atoms, in addition to the short chain organic group, may be introduced to cellulose. The introduced long chain organic group functions as a hydrophobic internal plasticizer so that the thermoplasticity or water resistance of the cellulose derivative is improved.

Algal biomass has attracted attention as a plant starting material of non-food components other than cellulose. Algae can be cultured in land unsuitable for agricultural land and do not compete with food production, and furthermore, algae can be repetitively cultured in a cyclic manner with $CO_2$, nutrient salts, and sunlight. Hence, their sustainable use is possible in place of fossil resources. Furthermore, the algae are capable of highly efficiently producing useful organic components, particularly, long chain fatty acids, polysaccharides, and the like effective as major components of bioplastics. β-1,3 Glucan (paramylon) is known as such an alga-derived polysaccharide. Paramylon is a polymer of glucose (degree of polymerization: 700-750) and is characterized by being constituted by only β-1,3 linkages. Paramylon, as in cellulose, has strong intermolecular force due to a hydrogen bond derived from hydroxy group and therefore has no thermoplasticity.

Hence, as for bioplastics obtained using paramylon, paramylon derivatives having thermoplasticity have been developed by adding acetyl group, long chain organic group, or the like to paramylon, as in cellulose.

Patent Document 1 describes a paramylon-based resin having a weight-average molecular weight of paramylon in a range of 70000 to 140000, and formed by substituting hydrogen atoms of hydroxy groups of a paramylon with a long-chain component and a short-chain component, wherein degrees of substitution therewith falls within a predetermined range, and the paramylon-based resin has predetermined Izod impact strength and melt flow rate.

CITATION LIST

Patent Literature

Patent Document 1: International Publication No. WO 2020/013232

SUMMARY OF INVENTION

Technical Problem

Patent Document 1 describes a paramylon-based resin that is obtained from paramylon having a weight average molecular weight in the range of 70000 to 140000 and however, has not made detailed discussion about paramylon having a weight average molecular weight of larger than 140000 and a paramylon-based resin that is obtained therefrom. Meanwhile, since paramylon obtained from, for example, a photosynthetically cultured alga is rich in components other than paramylon, its molecular weight may be difficult to adjust to 140000 or smaller. Thus, there has been a need for the development of methods for obtaining paramylon-based resins excellent in physical properties even from paramylon having a large molecular weight.

An object of the present invention is to provide a paramylon-based resin excellent in mechanical characteristics and thermoplasticity, a molding material and a molded body comprising the same, and a production method for a paramylon-based resin.

Solution to Problem

One aspect of the present embodiment provides a paramylon-based resin in which hydrogen atoms of hydroxy groups of paramylon are substituted by linear saturated aliphatic acyl group having 14 or more carbon atoms as a long chain component and/or acyl group having 2 or 3 carbon atoms (acetyl group or/and propionyl group) as a short chain component, wherein the paramylon has a weight average molecular weight in the range of more than 140000 to 220000 and a molecular weight distribution (weight average molecular weight/number average molecular weight) of 6.5 or less, a protein content in the paramylon is 0.22% by mass to 5.0% by mass, and a degree of substitution ($DS_{Lo}$) by the long chain component and a degree of substitution ($DS_{Sh}$) by the short chain component satisfy the following expressions (S1), (L1) and (T1):

$$1.7 \leq DS_{Sh} \leq 2.8 \quad (S1)$$

$$0 \leq DS_{Lo} \leq 0.4 \quad (L1)$$

$$2.1 \leq DS_{Lo} + DS_{Sh} \leq 2.8 \quad (T1)$$

Advantageous Effect of Invention

The present embodiment can provide a paramylon-based resin excellent in mechanical characteristics and thermoplasticity, a molding material and a molded body comprising the same, and a production method for a paramylon-based resin.

DESCRIPTION OF EMBODIMENTS

The paramylon-based resin according to the present embodiment is a paramylon derivative in which hydrogen atoms of hydroxy groups of paramylon are substituted by linear saturated aliphatic acyl group having 14 or more carbon atoms as a long chain component and/or acyl group having 2 or 3 carbon atoms (acetyl group or/and propionyl group) as a short chain component. Herein, the "paramylon-based resin" is also referred to as a "paramylon derivative".

<Paramylon>

First, the paramylon (before introduction of the long chain component and the short chain component) for use in the production of the paramylon-based resin of the present embodiment will be described.

The paramylon is a linear polymer obtained through the polymerization of β-D-glucose molecules (β-D-glucopyranose) represented by the formula (101) given below through β(1→3) glycoside linkages. Each of glucose units constituting the paramylon has three hydroxy groups (n in the formula represents a natural number). In an embodiment of the present invention, a short chain organic group and/or a long chain organic group can be introduced to such paramylon through the use of these hydroxy groups.

(101)

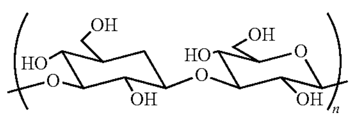

The paramylon is a main component of algae (particularly, *Euglena*). The paramylon is a polysaccharide accumulated as a reserve polysaccharide in *Euglena*, and is stored or consumed as an energy source depending on an environment including nutrient conditions. In the present embodiment, the *Euglena* from which the paramylon is to be extracted may be cultured under photosynthetic conditions or may be cultured under heterotrophic conditions using a medium supplemented with a carbon source. The culture of the *Euglena* under photosynthetic conditions has the advantage that carbon dioxide in the atmosphere can be fixed because the *Euglena* proliferates while taking up carbon dioxide into its cell. The culture of the *Euglena* under heterotrophic conditions decreases the amount of a pigment due to the degeneration of chlorophyll for photosynthesis, and enhances the transparency of a molded body of the paramylon-based resin. It is known that paramylon is composed of only glucose and the average degree of polymerization of paramylon obtained from *Euglena gracilis* is approximately 700 to 750 glucose units. The weight average molecular weight of paramylon (paramylon before a hydrolysis step mentioned later) measured by GPC is about 240000.

For the paramylon-based resin according to an embodiment of the present invention, it is preferred that a long chain component and/or a short chain component should be introduced to paramylon having a weight average molecular weight (Mw) in the range of more than 140000 and 220000 or less through the hydroxy group of the paramylon. The Mw of the paramylon may be preferably 150000 or more and may be preferably 200000 or less. If the weight average molecular weight of the paramylon is too low, the produced resin may have too high thermoplasticity and hinder molding even if the protein content of the paramylon falls within a prescribed range. On the other hand, if the weight average molecular weight is too high, the produced resin may be highly heterogeneous and have insufficient flexural strain at break. Also, if the weight average molecular weight is too high, the resin may have insufficient thermoplasticity and hinder molding. The molecular weight of the paramylon can be controlled by hydrolysis conditions in a hydrolysis step with an acid or an alkali mentioned later.

The molecular weight distribution (weight average molecular weight/number average molecular weight) of the paramylon is preferably 6.5 or less, more preferably 6.3 or less, further preferably 6.0 or less, and the lower limit can be preferably 2.0 or more. The paramylon having a molecular weight distribution of 6.5 or less facilitates obtaining a highly homogeneous paramylon-based resin. The number average molecular weight (Mn) of the paramylon is not particularly limited and is preferably, for example, 30000 to 70000.

The weight average molecular weight and the number average molecular weight of the paramylon are values measured under the following conditions by GPC (gel permeation chromatography).

(GPC Measurement Conditions for Paramylon)

Column: PLgel 20 m MIXED-A (product name, manufactured by Agilent Technologies Japan, Ltd.)

Eluent: Dimethylacetamide (DMAc) solution (0.1 M LiCl)

Flow rate: 0.5 mL/min

Detector: RI (differential refractive index) (RI-71 model 201 (16×) manufactured by Tosoh Corp.)

Temperature: 23.0° C.

Standard sample: Pullulan standard

In the present embodiment, the protein content of paramylon (second paramylon mentioned later) is preferably 0.22% by mass or more, more preferably 0.24% by mass or more, further preferably 1.0% by mass or more, and, in terms of the upper limit, is preferably 5.0% by mass or less, more preferably 4.8% by mass or less. The protein content of the paramylon can be measured in accordance with a method described in Examples mentioned later. When the protein content of the paramylon is 0.22% by mass or more, the produced resin has sufficient thermoplasticity and has favorable moldability. On the other hand, the paramylon having a protein content of 5% by mass or less facilitates obtaining a paramylon-based resin excellent in both mechanical characteristics such as flexural strength and heat resistance, and also improves the transparency of the paramylon-based resin.

The amount of a pigment in the paramylon (second paramylon mentioned later) used in the present embodiment is preferably 20 μg/g or less and may be 0 μg/g. The amount of a pigment in the paramylon can be measured by a method described in Examples mentioned later. When the amount of a pigment in the paramylon is 20 μg/g or less, the transparency of a molded body formed using the paramylon-based resin and a material comprising the same is improved.

The paramylon may be mixed with a substance having a similar structure, for example, cellulose, chitin, chitosan, hemicellulose, xylan, glucomannan, or curdlan, without impairing the advantageous effect of the invention of the present application. In the case of mixing the paramylon with such substance having a similar structure, the content of the substance having a similar structure is preferably 30% by mass or less, more preferably 20% by mass or less, further preferably 10% by mass or less, based on the whole mixture.

Although the description above is intended for the paramylon, the present invention is also applicable to its analogs such as usual non-food polysaccharides, specifically, cellulose, chitin, chitosan, hemicellulose, xylan, glucomannan, curdlan, and the like.

In the present embodiment, the paramylon (second paramylon mentioned later) for use in the production of the paramylon-based resin is obtained by a production method comprising the steps of: purifying paramylon recovered from a cultured alga (preferably *Euglena*) (purification step); and hydrolyzing the purified paramylon (hydrolysis step). Hereinafter, each step will be described.

(Paramylon Purification Step)

An alga after culture contains components other than paramylon (other components), such as proteins and pigments. Particularly, paramylon obtained from *Euglena* cultured under photosynthetic conditions has a large content of these other components. In the present embodiment, it is preferred to include a paramylon purification step (also simply referred to as a "purification step") to remove these other components, before a paramylon hydrolysis step mentioned later. The paramylon purification step comprises: a separation step of treating a cultured alga with an organic solvent to separate a component soluble in the organic solvent and solid matter containing paramylon (component insoluble in the organic solvent); and a surfactant treatment step of treating the solid matter separated by the separation step with a surfactant to obtain first paramylon. The separation step removes pigments as a component soluble in the organic solvent, and the surfactant treatment step removes proteins.

(Separation Step)

The separation step is the step of treating a cultured alga with an organic solvent to separate a component (containing pigments such as chlorophyll) soluble in the organic solvent and a component (containing paramylon) insoluble in the organic solvent. The alga after culture may be used as it is, and is preferably condensed. The condensation method is not particularly limited and may be a method such as centrifugation of the culture solution, gravitational separation, suction filtration, and sedimentation by gravity using a flocculant. In the case of using a flocculant, an inorganic flocculant such as magnesium sulfate or aluminum sulfate is preferably used. In the case of flocculation using, for example, magnesium sulfate, magnesium sulfate is added to the culture solution and converted to magnesium hydroxide by the pH adjustment of the culture solution to alkaline pH (pH 10 to 12) with a flocculation aid such as sodium hydroxide so that a floc is formed together with the alga to flocculate and be precipitated. After separation of a supernatant, the precipitate is rendered acidic (pH 2 to 4) by the addition of sulfuric acid, to thereby bring back the magnesium hydroxide to water-soluble magnesium sulfate, and accordingly the flocculant can be removed from the *Euglena* by washing with water. Sodium hydroxide, potassium hydroxide, or the like can be used as the flocculation aid for pH adjustment. Hydrochloric acid, sulfuric acid, or the like may be used as the acid for flocculant removal.

After condensation, a condensed alga containing 30 to 90% of water is obtained. The content of water differs depending on the condensation method, etc. This condensed alga is preferably subjected to the next step (step of treatment with an organic solvent) without being dried. Drying may cause an algal cell to shrink and inhibit an organic solvent and a surfactant from penetrating the cell in subsequent steps, resulting in reduced efficiency in treatment of pigments, lipids, proteins, and the like.

The condensed alga (preferably *Euglena*) can be treated (depigmented) with an organic solvent, and the resultant can be separated by filtration or the like into a component soluble in the organic solvent (component containing pigments, lipids, and the like) and another solid matter (component containing paramylon, proteins, and the like). Examples of the organic solvent include ethanol, methanol, propanol, butanol, ethylene glycol, diethyl ether, acetic acid, tetrahydrofuran, dioxane, acetone, ethyl methyl ketone, benzene, toluene, xylene, cyclohexene, pentane, hexane, heptane, acetonitrile, and chloroform, among which one solvent or a mixture of two or more thereof may be used, and a mixture of chloroform and methanol is preferably used. For example, an organic solvent having a chloroform:methanol mixing ratio (volume ratio) of 8:2 to 3:7 is preferably used. The amount of the organic solvent used is not particularly limited and is preferably about 3 mL to 20 mL based on the alga (particularly, *Euglena*) corresponding to a dry mass of 1 g. In the separation step, the condensed alga may be mixed with the organic solvent to extract lipids and pigments, followed by stirring. The number of times of extraction may be one, and the extraction is preferably performed two or three times. The extraction temperature is not particularly limited and is preferably, for example, 10 to 70° C., more preferably 20 to 60° C. (preferably equal to or lower than the boiling point of the organic solvent used). The extraction time is not particularly limited and is preferably, for example, 30 minutes to 24 hours, more preferably 30 minutes to 15 hours, further preferably about 30 minutes to 5 hours. In one mode, it is preferred that the condensed alga and the organic solvent is mixed and left standing overnight.

(Surfactant Treatment Step)

In the surfactant treatment step, the solid matter (component insoluble in the organic solvent) separated by the separation step is treated with a surfactant to remove proteins contained in the solid matter from paramylon. Herein, the paramylon after the surfactant treatment step and before a hydrolysis step mentioned later is also referred to as "first paramylon". Although the proteins in the paramylon are also degraded by a paramylon hydrolysis step with an acid or an alkali mentioned later, the surfactant treatment step involved before the step facilitates adjusting a molecular weight in the hydrolysis step and improves the physical properties of the paramylon-based resin obtained from the paramylon.

Examples of the surfactant include anionic surfactants, cationic surfactants, and nonionic surfactants.

Examples of the anionic surfactant include carboxylic acid-type surfactants such as sodium deoxycholate, sulfonic acid-type surfactants such as sodium linear alkylbenzenesulfonate, sulfuric acid ester-type surfactants such as sodium dodecyl sulfate (SDS), and phosphoric acid ester-type surfactants such as sodium lauryl phosphate.

Examples of the cationic surfactant include lauryl dimethylamine oxide and cetyl trimethylammonium bromide (CTAB).

Examples of the nonionic surfactant include polyoxyethylene sorbitan monolaurate (product name: Tween 20), polyoxyethylene(10) octyl phenyl ether (product name: Triton X-100), polyoxyethylene(23) lauryl ether, n-octyl-β-D-glucopyranoside, and n-dodecyl-β-D-maltoside.

The surfactant is preferably sodium dodecyl sulfate in view of being inexpensive and excellent in dispersive force.

In the surfactant treatment step, it is preferred that the solid matter separated by the separation step is treated with the surfactant in a liquid such as water so that proteins contained in the solid matter are dispersed in the liquid. In one mode, the solid matter is preferably mixed with an aqueous solution of the surfactant and may be mixed therewith while stirred. The temperature is not particularly limited, and the temperature of the liquid is preferably adjusted to, for example, 40° C. to 95° C. In the surfactant treatment step, the surfactant treatment may be performed a plurality of times. For example, the solid matter is treated with the surfactant, and then, the mixture is cooled and centrifuged to isolate the solid matter, which may then be treated with the surfactant again. In the case of performing treatment a plurality of times (preferably 2 to 5 times), the treatment conditions may be the same for each run or may be different. The treatment time (per run when the treatment is performed a plurality of times) is not particularly limited and is preferably, for example, 10 minutes to 2 hours.

In the surfactant treatment step, the concentration of the surfactant in the liquid is not particularly limited and is preferably 0.1 to 10% by mass, more preferably 0.1 to 5% by mass, further preferably 0.1 to 2% by mass. The amount of the surfactant is not particularly limited and is preferably 0.1 to 50 parts by mass, more preferably 1 to 20 parts by mass, per 100 parts by mass of the solid matter.

In the present embodiment, the protein content of the first paramylon after the surfactant treatment step is not particularly limited and is preferably 1 to 25% by mass, more preferably 2 to 19% by mass, further preferably 3 to 15% by mass. When the protein content of the first paramylon falls within the range, the molecular weight and the molecular weight distribution of the paramylon is easily adjusted in a paramylon hydrolysis step mentioned later. The protein content of the paramylon after the hydrolysis step is also easily adjusted, and the characteristics of the resulting paramylon-based resin are improved.

(Paramylon Hydrolysis Step)

In the hydrolysis step, the first paramylon after the surfactant treatment step is hydrolyzed with an acid or an alkali to adjust the molecular weight of the paramylon. The hydrolysis step can also hydrolyze proteins remaining in the first paramylon to obtain more purified paramylon. Herein, the paramylon after the hydrolysis step is also referred to as "second paramylon". In the present embodiment, this second paramylon is used in the production of the paramylon-based resin.

Examples of the acid or the alkali for use in the hydrolysis step include hydrochloric acid, sulfuric acid, water-soluble organic acids (formic acid, acetic acid, propionic acid, oxalic acid, malonic acid, succinic acid, glycolic acid, lactic acid, etc.), sodium hydroxide, and potassium hydroxide. In the case of using, for example, hydrochloric acid, a 0.5 to 15% aqueous hydrochloric acid solution is preferably reacted with the first paramylon, and a 5- to 20-fold mass of the aqueous hydrochloric acid solution per gram of the first paramylon is more preferably reacted. The reaction temperature and the reaction time can be adjusted according to the protein content of the first paramylon, the molecular weight of the paramylon of interest, etc., and the reaction is preferably performed, for example, at 50 to 100° C. for 30 minutes to 7 hours. After the hydrolysis step, the acid or the alkali can be removed by neutralization or washing with water.

The molecular weight, the protein content, and the pigment content of the second paramylon can be controlled by hydrolysis conditions. The present inventors have found that the physical properties, such as flexural strain at break and moldability, of a molded body formed using the paramylon-based resin are improved by adjusting the protein content, etc. of the paramylon for use in the production of the paramylon-based resin to within the predetermined range.

<Paramylon-Based Resin>

The paramylon-based resin of the present embodiment is a paramylon-based resin in which hydrogen atoms of hydroxy groups of the paramylon (second paramylon) are substituted by linear saturated aliphatic acyl group having 14 or more carbon atoms as a long chain component (also simply referred to as a "long chain component") and/or acyl group having 2 or 3 carbon atoms (acetyl group or propionyl group) as a short chain component (also simply referred to as a "short chain component"). In the paramylon-based resin of the present embodiment, the degree of substitution ($DS_{Lo}$) by the long chain component and the degree of substitution ($DS_{Sh}$) by the short chain component preferably satisfy the following expressions (S1), (L1) and (T1).

$$1.7 \leq DS_{Sh} \leq 2.8 \qquad (S1)$$

$$0 \leq DS_{Lo} \leq 0.4 \qquad (L1)$$

$$2.1 \leq DS_{Lo} + DS_{Sh} \leq 2.8 \qquad (T1)$$

In the paramylon-based resin, the hydrogen atoms of hydroxy groups of the paramylon may be substituted by both the long chain component and the short chain component or may be substituted by only the short chain component.

In a preferred mode of the paramylon-based resin of the present example embodiment, $DS_{Lo}$ and $DS_{Sh}$ satisfy the following expressions (S2) and (L2), in addition to the expression (T1).

$$1.7 \leq DS_{Sh} < 2.8 \qquad (S2)$$

$$0 < DS_{Lo} \leq 0.4 \qquad (L2)$$

In a more preferred mode of the paramylon-based resin of the present example embodiment, $DS_{Lo}$ and $DS_{Sh}$ satisfy the following expressions (S3) and (L3), in addition to the expression (T1).

$$1.9 \leq DS_{Sh} \leq 2.4 \qquad (S3)$$

$$0.18 \leq DS_{Lo} \leq 0.4 \qquad (L3)$$

In a preferred mode of the paramylon-based resin of the present example embodiment, the following expressions (S4) and (L4) are satisfied.

$$2.1 \leq DS_{Sh} \leq 2.8 \qquad (S4)$$

$$DS_{Lo} = 0 \qquad (L4)$$

The paramylon-based resin of the present embodiment is excellent in mechanical characteristics (flexural strength, flexural modulus, flexural strain at break, etc.), heat resistance and thermoplasticity, and has high transparency and therefore excellent appearance.

The MFR (melt flow rate at 230° C. under a load of 20 kg) of the paramylon-based resin according to an embodiment of the present invention is preferably 3 g/10 min or more. This MFR is preferably 5 g/10 min or more, more preferably 7 g/10 min or more, further preferably 10 g/10 min or more, in view of preventing a problem with molding due to excessively low fluidity. Although the upper limit of the MFR is not particularly limited, the MFR can generally be 200 g/10 min or less and is preferably 180 g/10 min or less, more preferably 150 g/10 min or less, further preferably 100 g/10 min or less. A resin having too large MFR tends to include a large amount of residues such as proteins, and this may deteriorate flexural characteristics or molded body appearance. The MFR can be measured by a measurement method described in Examples.

The glass transition temperature (Tg) of the paramylon-based resin according to the present embodiment is preferably 93° C. or higher, more preferably 95° C. or higher, and the upper limit is not particularly limited and is, for example, about 125° C. The Tg can be measured by a method described in Examples.

When a molded body is produced by a method described in Examples using the paramylon-based resin according to an embodiment of the present invention, the flexural strain at break of the obtained molded body is preferably 3% or more, more preferably 4% or more. The flexural strain at break can be measured by a method described in Examples.

(Long Chain Component)

The paramylon-based resin of one mode of an embodiment of the present invention comprises a short chain component as well as a long chain component introduced through the use of hydroxy group of the paramylon.

The long chain component can be introduced through the reaction of hydroxy group in the paramylon with a long chain reactant. This long chain component corresponds to acyl group introduced in place of the hydrogen atom of hydroxy group of the paramylon. Long chain organic group of the long chain component can be bonded to a pyranose ring of the paramylon via an ester bond. This introduced acyl group is linear saturated aliphatic acyl group having 14 or more carbon atoms, and examples thereof include linear saturated aliphatic acyl group having 14 to 30 carbon atoms, which is preferably linear saturated aliphatic acyl group having 14 to 22 carbon atoms, more preferably a group obtained by removing OH from carboxyl group of myristic acid, palmitic acid, stearic acid, arachidic acid, or behenic acid (tetradecanoyl group, hexadecanoyl group, octadecanoyl group, icosanoyl group, and docosanoyl group).

The long chain reactant is a compound having at least one functional group that can react with hydroxy group in the paramylon, and, for example, a compound having carboxyl group, carboxylic acid halide group, or carboxylic anhydride group can be used.

For example, long chain carboxylic acid having 14 or more carbon atoms, or acid halide or acid anhydride of the long chain carboxylic acid can be used as the long chain reactant. The degree of saturation of such carboxylic acid or a carboxylic acid derivative is desirably as high as possible, and a linear saturated fatty acid or acid halide or anhydride thereof is preferred. Specific examples of the long chain carboxylic acid include linear saturated fatty acids such as myristic acid, pentadecylic acid, palmitic acid, margaric acid, stearic acid, arachidic acid, behenic acid, lignoceric acid, cerotic acid, montanic acid, and melissic acid, and myristic acid, palmitic acid, stearic acid, arachidic acid, or behenic acid is preferred. The long chain carboxylic acid is preferably carboxylic acid obtained from a natural product in view of environmental friendliness. Carboxylic acid derived from a lipid extracted from an alga can be used as the carboxylic acid obtained from a natural product. For example, a free fatty acid can be obtained from a lipid extracted from *Euglena* through saponification reaction with potassium hydroxide or high-temperature and high-pressure hydrolysis, and further subjected to hydrogenation reaction to obtain C14 to C22 mixed saturated long chain carboxylic acid.

This long chain component preferably has 14 or more carbon atoms, particularly preferably 16 or more carbon atoms. The number of carbon atoms is preferably 48 or less, more preferably 36 or less, particularly preferably 22 or less, in view of reaction efficiency at the time of long chain component introduction. This long chain component may be used singly or may include two or more thereof.

An average number of introduced long chain components ($DS_{Lo}$) per glucose unit of the paramylon (long chain component introduction ratio), i.e., an average number of hydroxy group substituted by the long chain component (linear saturated aliphatic acyl group having 14 or more carbon atoms) per glucose unit (degree of substitution at hydroxy group), preferably satisfies the expression (L1) given below. In one mode, $DS_{Lo}$ may be 0 (i.e., no long chain component is contained).

$$0 \leq DS_{Lo} \leq 0.4 \quad \text{(L1)}$$

In one mode of the present embodiment, the following expression (L2) is more preferably satisfied, and the following expression (L3) is further preferably satisfied.

$$0 < DS_{Lo} \leq 0.4 \quad \text{(L2)}$$

$$0.18 \leq DS_{Lo} \leq 0.4 \quad \text{(L3)}$$

When $DS_{Lo}$ is 0.18 or more, a sufficient effect of long chain component introduction can be obtained. $DS_{Lo}$ is more preferably 0.19 or more. $DS_{Lo}$ is preferably 0.4 or less, more preferably 0.25 or less, in view of efficiency at the time of production, and durability (strength, heat resistance, etc.).

The introduction of the long chain component mentioned above to the paramylon or a derivative thereof can modify its characteristics and can improve, for example, water resistance, thermoplasticity, and mechanical characteristics such as flexural strength.

(Short Chain Component)

The paramylon-based resin according to an embodiment of the present invention may include, in addition to the long chain component, a short chain component introduced through the use of hydroxy group of the paramylon, or may include only a short chain component introduced therethrough. The short chain component is preferably acetyl group and/or propionyl group and preferably includes at least propionyl group, and propionyl group is particularly preferred.

Such a short chain component can be introduced through the reaction of hydroxy group in the paramylon with a short chain reactant. This short chain component corresponds to an acyl group moiety introduced in place of the hydrogen atom of hydroxy group of the paramylon. Short chain organic group (methyl group or ethyl group) of the short chain component can be bonded to a pyranose ring of the paramylon via an ester bond.

This short chain reactant is a compound having at least one functional group that can react with hydroxy group in the paramylon, and examples thereof include compounds having carboxyl group, carboxylic acid halide group, or carboxylic anhydride group. Specifically, examples thereof include aliphatic monocarboxylic acid, acid halide thereof, and acid anhydride thereof.

This short chain component preferably has 2 or 3 carbon atoms, more preferably 3 carbon atoms, and the hydrogen atom of hydroxy group of the paramylon is preferably substituted by acyl group having 2 or 3 carbon atoms (acetyl group and/or propionyl group), more preferably at least acyl group having 3 carbon atoms (propionyl group).

An average number of introduced short chain components ($DS_{Sh}$) per glucose unit of the paramylon (short chain component introduction ratio), i.e., an average number of hydroxy group substituted by the short chain component (acetyl group or/and propionyl group) per glucose unit (degree of substitution at hydroxy group), preferably satisfies the following expression (S1).

$$1.7 \leq DS_{Sh} \leq 2.8 \quad \text{(S1)}$$

When the hydrogen atoms of hydroxy groups of the paramylon are substituted by both the long chain component and the short chain component (i.e., when the expression (L2) is satisfied), the following expression (S2) is preferably satisfied, the following expression (S3) is more preferably satisfied, and the following expression (S3-1) is further preferably satisfied.

$$1.7 \leq DS_{Sh} < 2.8 \quad \text{(S2)}$$

$$1.9 \leq DS_{Sh} \leq 2.4 \quad \text{(S3)}$$

$$2.0 \leq DS_{Sh} \leq 2.3 \quad \text{(S3-1)}$$

$DS_{Sh}$ is preferably 1.7 or more in view of water resistance, fluidity, etc., and when $DS_{Sh}$ is 2.4 or less, an effect of the long chain component can be sufficiently obtained while an effect of short chain component introduction is obtained.

When the hydrogen atoms of hydroxy groups of the paramylon are substituted by only the short chain component (i.e., when the expression (L4) is satisfied), the following expression (S4) is preferably satisfied, and the following expression (S5) is more preferably satisfied.

$$2.1 \leq DS_{Sh} \leq 2.8 \quad \text{(S4)}$$

$$2.4 \leq DS_{Sh} \leq 2.7 \quad \text{(S5)}$$

$DS_{Sh}$ is preferably 2.1 or more in view of water resistance, fluidity, etc. and is preferably 2.8 or less in view of heat resistance.

The introduction of the short chain component mentioned above to the paramylon or a derivative thereof can reduce the intermolecular force (intermolecular bond) of the paramylon and can enhance mechanical characteristics such as elastic modulus and physical properties of chemical resistance and surface hardness.

(Proportion of Long Chain Component and Proportion of Short Chain Component)

In one mode of the present embodiment, when the hydrogen atoms of hydroxy groups of the paramylon are substituted by both the long chain component and the short chain component, the ratio of the proportion of the short chain component to the proportion of the long chain component ($DS_{Sh}/DS_{Lo}$) is preferably 5 or more and 25 or less. If this ratio is too low, the material may be too flexible and have reduced strength or heat resistance. On the other hand, if the ratio exceeds 25, the material may have inadequate thermoplasticity and be thus unsuitable for use in molding. From these viewpoints, in one mode, $DS_{Sh}/DS_{Lo}$ is preferably 5 or more, more preferably 6 or more, and preferably 25 or less, more preferably 18 or less, and may be 10 or less.

The total of the proportion of the long chain component and the proportion of the short chain component ($DS_{Lo}+DS_{Sh}$) preferably satisfies $$2.1 \leq DS_{Lo}+DS_{Sh} \leq 2.8 \quad \text{(T1)}$$

$DS_{Lo}+DS_{Sh}$ is preferably 2.1 or more, more preferably 2.2 or more, in view of obtaining a sufficient effect of acyl group introduction, and is preferably 2.8 or less, more preferably 2.7 or less, in view of mechanical characteristics, etc.

(Amount of Hydroxy Group Remaining in Paramylon-Based Resin)

A larger amount of hydroxy group remaining tends to increase the maximum strength and heat resistance of the paramylon-based resin and on the other hand, tends to enhance water absorbability. Meanwhile, a higher rate of conversion (degree of substitution) of hydroxy group tends to reduce water absorbability and increase plasticity and strain at break and on the other hand, tends to reduce maximum strength and heat resistance. The rate of conversion of hydroxy group can be appropriately set in consideration of these tendencies, etc.

An average number of remaining hydroxy group per glucose unit of the finally produced paramylon-based resin (degree of remaining of hydroxy group, $DS_{OH}$) is preferably in the range of 0.2 to 0.9. The degree of remaining of hydroxy group of the finally produced paramylon-based resin is preferably 0.3 or more, more preferably 0.4 or more, in view of mechanical characteristics such as maximum strength and durability such as heat resistance, and is preferably 0.8 or less, more preferably 0.6 or less, in view of fluidity as well as water resistance, etc.

(Activation of Paramylon)

Prior to a reaction step for introducing the long chain component and/or the short chain component to the paramylon, activation treatment (pretreatment step) may be performed in order to enhance the reactivity of the paramylon. Activation treatment that is usually performed before paramylon acetylation can be applied to this activation treatment.

In the activation treatment, for example, the paramylon is swollen through the contact of the paramylon with an activating solvent by a wet method, such as a method including spraying the activating solvent having affinity for the paramylon to the paramylon or a method including dipping the paramylon in the activating solvent (dipping method). This facilitates a reactant to enter between paramylon molecular chains (facilitates a solvent or a catalyst, if used, to enter together therewith), and therefore improves the reactivity of the paramylon. In this context, examples of the activating solvent include: water; carboxylic acid such as acetic acid, propionic acid, butyric acid, valeric acid, caproic acid, enanthic acid, caprylic acid, pelargonic acid, and stearic acid; alcohols such as methanol, ethanol, propanol, and isopropanol; nitrogen-containing compounds such as dimethylformamide, formamide, ethanolamine, and pyridine; and sulfoxide compounds such as dimethyl sulfoxide, and two or more thereof may be used in combination. Particularly preferably, water, acetic acid, pyridine, and/or dimethyl sulfoxide may be used.

The paramylon may be activated by addition into a long chain fatty acid. When the long chain fatty acid has a melting point equal to or higher than room temperature, the mixture may be heated to a temperature equal to or higher than the melting point.

The amount of the activating solvent used may be, for example, 10 parts by mass or more, preferably 20 parts by mass or more, more preferably 30 parts by mass or more, per 100 parts by mass of the paramylon. In the case of dipping the paramylon in the activating solvent, the amount thereof can be, 1 or more times, preferably 5 or more times, more preferably 10 or more times larger than the mass of the paramylon. The amount of the activating solvent is preferably 300 or less times, more preferably 100 or less times, further preferably 50 or less times larger than the mass of the paramylon, in view of the burden of removal of the activating solvent after pretreatment, reduction in material cost, etc.

The temperature of the activation treatment may be appropriately set in the range of, for example, 0 to 100° C. The temperature is preferably 10 to 40° C., more preferably 15 to 35° C., in view of activation efficiency and reduction in energy cost.

In the case of adding the paramylon to a melted long chain fatty acid, the mixture may be heated to a temperature equal to or higher than the melting point of the long chain fatty acid.

The time of the activation treatment may be in the range of, for example, 0.1 hours to 72 hours as appropriate. The time is preferably 0.1 hours to 24 hours, more preferably 0.5 hours to 3 hours, in view of performing sufficient activation and reducing the treatment time.

After the activation treatment, an excess of the activating solvent can be removed by a solid-liquid separation method such as suction filtration, filter press, or compression.

After the activation treatment, the activating solvent contained in the paramylon can be replaced with a solvent for use in reaction. For example, the activating solvent is changed to a solvent for use in reaction, and the replacement can be performed in accordance with the dipping method of the activation treatment described above.

(Method for Introducing Long Chain Component and/or Short Chain Component)

The paramylon derivative (paramylon-based resin) according to an embodiment of the present invention can be produced by a method given below. In the description below, the case of substituting the hydrogen atoms of hydroxy groups of the paramylon by both the long chain component and the short chain component will be described as one mode. In the case of substituting the hydrogen atoms of hydroxy groups of the paramylon by only the short chain component, the same method can be applied, except for using only a short chain reactant described below without the use of a long chain reactant described below.

The production method for the paramylon derivative according to an embodiment of the present invention has the step of acylating hydroxy group of the paramylon in a solvent by reacting the paramylon dispersed in this solvent with a short chain reactant (short chain acylating agent) and a long chain reactant (long chain acylating agent) under warming in the presence of an acid scavenging component. The short chain reactant (short chain acylating agent) and the long chain reactant (long chain acylating agent) are preferably dissolved in the solvent. The acid scavenging component may be used as the solvent.

The long chain reactant for introducing the long chain component to the paramylon is preferably acid chloride of the linear saturated fatty acid, which may be used singly or may be used in combination of two or more thereof. The short chain reactant for introducing the short chain component to the paramylon is preferably acetyl chloride or/and propionyl chloride, more preferably propionyl chloride.

The amounts of the long chain reactant and the short chain reactant added can be set according to the degree of substitution ($DS_{Lo}$) by the long chain component and the degree of substitution ($DS_{Sh}$) by the short chain component in the paramylon derivative of interest. In one mode, too large an amount of the short chain reactant may decrease the amount of the long chain component bonded and decrease the degree of substitution ($DS_{Lo}$) by the long chain component.

A solvent having a liquid retention ratio of 90% by volume or more through a filter paper made of cotton fiber can be used as the solvent.

The "liquid retention ratio" can be measured by the following method.

A filter paper made of cotton fiber (5B, 40 mm ϕ, water content: approximately 2%) is dipped in each solvent at room temperature for 1 hour. The weight is measured before and after dipping and the values of the weight are applied to the expression given below to determine a liquid retention ratio (vol %). The weight was measured when dripping of the solvent from the sample thus dipped stopped.

Liquid retention ratio (vol %)=(Weight after dipping−Weight before dipping)/Weight before dipping/Solvent specific gravity×100

Examples of the solvent having a liquid retention ratio of 90 vol % or more in accordance with the approach described above include water (liquid retention ratio: 145 vol %), acetic acid (liquid retention ratio: 109 vol %), dioxane (liquid retention ratio: 93 vol %), pyridine (liquid retention ratio: 109 vol %), N-methylpyrrolidone (liquid retention ratio: 104 vol %), N,N-dimethylacetamide (liquid retention ratio: 112 vol %), N,N-dimethylformamide (liquid retention ratio: 129 vol %), and dimethyl sulfoxide (liquid retention ratio: 180 vol %).

The acid scavenging component is not particularly limited as long as the acid scavenging component is a base that neutralizes a by-product acid (hydrochloric acid, acetic acid, propionic acid, etc.). Examples thereof include: alkali metal hydroxide such as sodium hydroxide and potassium hydroxide; alkaline earth metal hydroxide such as calcium hydroxide and barium hydroxide; metal alkoxide such as sodium methoxide and sodium ethoxide; and nitrogen-containing nucleophilic compounds such as diazabicycloundecene, diazabicyclononene, triethylamine, and pyridine. Among these, triethylamine or pyridine is preferred, and pyridine is particularly preferred since pyridine can also be used as the solvent. In the case of adding the acid scavenging component aside from the solvent, the acid scavenging component preferably exists in the reaction system from the start of reaction. The acid scavenging component may be added before or after addition of the acylating agent as long as the acid scavenging component exists in the reaction system at the start of reaction.

The amount of the acid scavenging component added is preferably 0.1 to 10 equivalents, more preferably 0.5 to 5 equivalents, based on the total amount of the long chain reactant (long chain acylating agent) and the short chain reactant (short chain acylating agent) added. However, in the case of using a nitrogen-containing nucleophilic compound as the solvent, the amount is not limited to this range. A small amount of the acid scavenger added reduces the efficiency of acylation reaction. A large amount of the acid scavenger added may degrade the paramylon and decrease its molecular weight.

The reaction temperature in this acylation step is preferably 50 to 100° C., more preferably 75 to 95° C. The reaction time may be 2 hours to 5 hours and is preferably 3 hours to 4 hours. A sufficiently high reaction temperature can elevate a reaction rate to complete acylation reaction in a relatively short time, and can thus enhance reaction efficiency. When the reaction temperature falls within the range described above, decrease in molecular weight by heating can be suppressed.

The amount of the solvent can be 10 to 50 times larger than the dry mass of the starting material paramylon and is preferably 10 to 40 times larger than it (mass ratio).

(Aging Step)

After the acylation step described above, it is preferred to add an alkaline aqueous solution and retain the mixture (aging) with warming. The temperature of this aging is preferably 25 to 75° C., more preferably 40 to 70° C., and the aging time may be the range of 1 to 5 hours and is preferably in the range of 1 to 3 hours.

The amount of the alkaline aqueous solution added may be an amount corresponding to 3 to 30% by mass based on the solvent used and is preferably an amount corresponding to 5 to 20% by mass.

Examples of the alkaline aqueous solution include aqueous solutions of sodium hydroxide, potassium hydroxide, sodium carbonate, or sodium bicarbonate, and an aqueous solution of sodium hydroxide is preferred. The concentration of the alkaline aqueous solution is preferably 1 to 30% by mass, more preferably 5 to 20% by mass.

Such an aging step can partially hydrolyze the temporarily bonded long chain component and short chain component to homogeneously regenerate hydroxy group to thereby enhance mechanical characteristics such as strength or impact resistance, and can also result in obtaining a product with favorable nature (fine particulate form) in a subsequent deposition step.

(Recovery Step)

The paramylon derivative (product) comprising the introduced long chain component and/or short chain component can be recovered from the reaction solution in accordance with a usual recovery method. Although the method is not limited, a recovery method including performing solid-liquid separation of the reaction solution and the product is preferred in view of production energy when the product is not dissolved in the reaction solution. If solid-liquid separation is difficult due to the product dissolved in or having affinity for the reaction solution, the reaction solution can be distilled off to recover the product as residues. Alternatively, a poor solvent for the product may be added to the reaction solution so that the deposited product can be recovered by solid-liquid separation.

In the case of distilling off the reaction solution, the short chain reactant, the reaction solvent, and a catalyst preferably have a low boiling point, whereas the catalyst may be removed from the product with a washing solvent or the like without being distilled off. When components other than the product, such as the solvent, are distilled off from the reaction solution, the distillation is terminated when the product is deposited, and then, solid-liquid separation may be performed between the remaining reaction solution and the deposited product to recover the product.

Examples of the solid-liquid separation method include filtration (spontaneous filtration, filtration under reduced pressure, pressure filtration, centrifugal filtration, and filtration under heat thereof), spontaneous sedimentation/floating, liquid separation, centrifugation, and compression, and these may be performed in appropriate combination.

The product (paramylon derivative) dissolved in the filtrate after solid-liquid separation can be deposited by the addition of a poor solvent for the product and further recovered by solid-liquid separation.

The solid matter (paramylon derivative) recovered from the reaction solution can be washed, if necessary, and dried by a usual method.

The paramylon derivative produced by the present method can have a crystal structure reinforced by paramylon backbone crystals in thermoplastic matrix. This is due to an unreacted moiety in acylating the paramylon starting material. Such paramylon backbone crystals can be evaluated by, for example, X ray diffractometry. For this evaluation, for example, signals may be easily confirmed by pressing the paramylon derivative and thereby elevating the density.

(Other Production Methods for Paramylon Derivative)

The paramylon-based resin can be obtained by acylating the paramylon in a solid-liquid heterogeneous system with mixed acid anhydride having the long chain component and the short chain component as an acylating agent. The paramylon is preferably subjected to activation treatment. The activation treatment can be performed by a usual method.

The acylation can be performed by stirring at 45 to 65° C. for 2 to 5 hours in the presence of an acid catalyst (e.g., sulfuric acid) in a solvent having a liquid retention ratio of 90% or more through a filter paper made of cotton fiber (e.g., dioxane in an amount of, for example, 80 to 120 times larger than the weight of dry paramylon). It is preferred to then add water, followed by aging under heating (e.g., 55 to 75° C.) for several hours (e.g., 1 to 3 hours).

After the completion of reaction, the product dissolved in the liquid phase can be sufficiently deposited by the addition of a poor solvent such as a water/methanol mixed solvent, and the product can be recovered by solid-liquid separation. Then, washing and drying can be performed.

The acylation may be performed in a homogeneous dissolved system in which the paramylon and an acylating agent are dissolved in a solvent. The paramylon is preferably subjected to activation treatment. The activation treatment can be performed by a usual method.

A solvent having high affinity for the paramylon, such as N,N-dimethylacetamide, pyridine, or N-methylpyrrolidinone is used as the solvent for acylation.

Mixed acid anhydride having the long chain component and the short chain component is formed in the same solvent as that for use in acylation, and can be used as the acylating agent.

After the completion of reaction, the product is deposited by the addition of a poor solvent such as methanol, and the product can be recovered by solid-liquid separation. Then, washing and drying can be performed.

(Resin Composition and Additive for Molding)

An additive can be added according to the desired characteristics to the paramylon derivative according to an embodiment of the present invention to obtain a resin composition suitable as a molding material. This paramylon derivative can be compatible with an additive compatible with a usual paramylon derivative.

Various additives for use in usual thermoplastic resins can be applied to the paramylon derivative according to an embodiment of the present invention. For example, thermoplasticity or elongation at break can be further improved by the addition of a plasticizer. Examples of such a plasticizer include: phthalic acid ester such as dibutyl phthalate, diaryl phthalate, diethyl phthalate, dimethyl phthalate, di-2-methoxyethyl phthalate, ethyl phthalyl ethyl glycolate, and methyl phthalyl ethyl glycolate; tartaric acid ester such as dibutyl tartrate; adipic acid ester such as dioctyl adipate and diisononyl adipate; polyhydric alcohol ester such as triacetin, diacetyl glycerin, tripropionitrile glycerin, and glycerin monostearate; phosphoric acid ester such as triethyl phosphate, triphenyl phosphate, and tricresyl phosphate; dibasic fatty acid ester such as dibutyl adipate, dioctyl adipate, dibutyl azelate, dioctyl azelate, and dioctyl sebacate; citric acid ester such as triethyl citrate, acetyltriethyl citrate, and tributyl acetylcitrate; epoxidized plant oils such as epoxidized soybean oil and epoxidized flaxseed oil; castor oil and derivatives thereof; benzoic acid ester such as ethyl O-benzoyl benzoate; aliphatic dicarboxylic acid ester such as sebacic acid ester and azelaic acid ester; unsaturated dicarboxylic acid ester such as maleic acid ester; and others such as N-ethyltoluenesulfonamide, triacetin, O-cresyl p-toluenesulfonate, and tripropionin. Particularly, the addition of a plasticizer such as dioctyl adipate, benzyl-2-butoxyethoxyethyl adipate, tricresyl phosphate, diphenylcresyl phosphate, or diphenyloctyl phosphate can effectively improve not only thermoplasticity and elongation at break but also impact resistance.

Other examples of the plasticizer include: cyclohexanedicarboxylic acid ester such as dihexyl cyclohexanedicarboxylate, dioctyl cyclohexanedicarboxylate, and di-2-methyloctyl cyclohexanedicarboxylate; trimellitic acid ester such as dihexyl trimellitate, diethylhexyl trimellitate, and dioctyl trimellitate; and pyromellitic acid ester such as dihexyl pyromellitate, diethylhexyl pyromellitate, and dioctyl pyromellitate.

To the paramylon derivative according to an embodiment of the present invention, an inorganic or organic particulate or fibrous filler can be added, if necessary. The addition of the filler can further improve strength or rigidity. Examples of the filler include mineral particles (talc, mica, calcined diatomaceous earth, kaolin, sericite, bentonite, smectite, clay, silica, quartz powders, glass beads, glass powders, glass flakes, milled fiber, wollastonite, etc.), boron-containing compounds (boron nitride, boron carbide, boronated titanium, etc.), metal carbonate (magnesium carbonate, heavy calcium carbonate, light calcium carbonate, etc.), metal silicate (calcium silicate, aluminum silicate, magnesium silicate, magnesium aluminosilicate, etc.), metal oxide (magnesium oxide, etc.), metal hydroxide (aluminum hydroxide, calcium hydroxide, magnesium hydroxide, etc.), metal sulfate (calcium sulfate, barium sulfate, etc.), metal carbide (silicon carbide, aluminum carbide, titanium carbide, etc.), metal nitride (aluminum nitride, silicon nitride, titanium nitride, etc.), white carbon, and various metal foils. Examples of the fibrous filler include organic fiber (natural fiber, sheets, etc.), inorganic fiber (glass fiber, asbestos fiber, carbon fiber, silica fiber, silica-alumina fiber, wollastonite, zirconia fiber, potassium titanate fiber, etc.), and metal fiber. These fillers may be used each singly or in combination of two or more.

To the paramylon derivative according to an embodiment of the present invention, a flame retardant can be added, if necessary. The addition of the flame retardant can impart flame retardancy. Examples of the flame retardant include magnesium hydroxide, aluminum hydroxide, metal hydrate such as hydrotalcite, basic magnesium carbonate, calcium carbonate, silica, alumina, talc, clay, zeolite, bromine-based flame retardants, antimony trioxide, phosphoric acid-based flame retardants (aromatic phosphoric acid esters, aromatic condensed phosphoric acid esters, etc.), and compounds containing phosphorus and nitrogen (phosphazene compounds). These flame retardants may be used each singly or in combination of two or more.

To the paramylon derivative according to an embodiment of the present invention, an impact modifier can be added, if necessary. The addition of the impact modifier can improve impact resistance. Examples of the impact modifier include rubber components and silicone compounds. Examples of the rubber component include natural rubber, epoxidized natural rubber, and synthetic rubber. Examples of the silicone compound include organic polysiloxane formed by the polymerization of alkylsiloxane, alkylphenylsiloxane, or the like, and modified silicone compounds obtained by the side chain or terminal modification of the organic polysiloxane with polyether, methylstyryl, alkyl, higher fatty acid ester, alkoxy, fluorine, amino group, epoxy group, carboxyl group, carbinol group, methacryl group, mercapto group, phenol group, or the like. These impact modifiers may be used each singly or in combination of two or more.

The silicone compound is preferably a modified silicone compound (modified polysiloxane compound). The modified silicone compound is preferably modified polydimethylsiloxane that has a backbone constituted by repeat units of dimethylsiloxane and has a structure where some side chain or terminal methyl groups are substituted by organic substituents containing at least one group selected from amino group, epoxy group, carbinol group, phenol group, mercapto group, carboxyl group, methacryl group, long chain alkyl group, aralkyl group, phenyl group, phenoxy group, alkylphenoxy group, long chain fatty acid ester group, long chain fatty acid amide group, and polyether group. Due to having such organic substituents, the modified silicone compound has improved affinity for the paramylon derivative mentioned above, so that the modified silicone has improved dispersibility in the paramylon derivative, and accordingly, a resin composition excellent in impact resistance can be obtained.

Such a modified silicone compound to be used can be produced in accordance with a usual method.

Examples of the above described organic substituent contained in this modified silicone compound can include those represented by the following formulas (2) to (20).

(2)

$$—R^1—NH_2$$

(3)

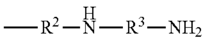

(4)

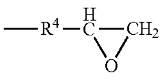

(5)

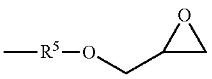

(6)

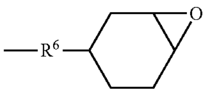

(7)

$$—R^7—OH$$

(8)

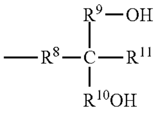

(9)

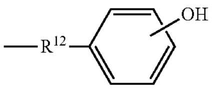

-continued $$—R^{13}—SH \quad (10)$$

$$—R^{14}COOH \quad (11)$$

(12)

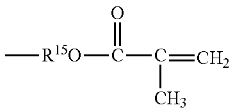

$$—R^{16} \quad (13)$$

(14)

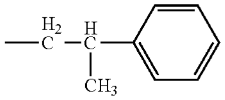

(15)

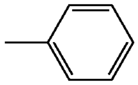

(16)

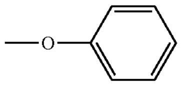

(17)

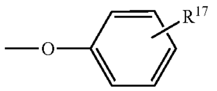

(18)

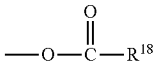

(19)

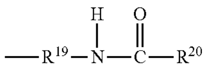

$$—R^{21}(C_2H_4O)_a[CH_2CH(CH_3)O]_bR^{22} \quad (20)$$

In the formulae described above, a and b each represent an integer of 1 to 50.

In the formulas described above, $R^1$ to $R^{10}$, $R^{12}$ to $R^{15}$, $R^{19}$, and $R^{21}$ each represent divalent organic group. Examples of the divalent organic group can include alkylene group such as methylene group, ethylene group, propylene group, and butylene group, alkylarylene group such as phenylene group and tolylene group, oxyalkylene group or polyoxyalkylene group such as $—(CH_2—CH_2—O)_c—$ (wherein c represents an integer of 1 to 50) and $—[CH_2—CH(CH_3)—O]_d—$ (wherein d represents an integer of 1 to 50), and $—(CH_2)_e—NHCO—$ (wherein e represents an integer of 1 to 8). Among them, alkylene group is preferred, and ethylene group or propylene group is particularly preferred.

In the formulas described above, $R^{11}$, $R^{16}$ to $R^{18}$, $R^{20}$, and $R^{22}$ each represent alkyl group having 20 or less carbon atoms. Examples of the alkyl group include methyl group, ethyl group, propyl group, butyl group, pentyl group, hexyl group, heptyl group, octyl group, nonyl group, decyl group, undecyl group, dodecyl group, tridecyl group, tetradecyl group, and pentadecyl group. The structure of the alkyl group may have one or more unsaturated bonds.

The total average content of the organic substituents in the modified silicone compound is desirably in a range such that the modified silicone compound is dispersible with a moderate particle size (e.g., 0.1 m or larger and 100 m or smaller) in the paramylon derivative of matrix at the time of production of the paramylon derivative composition. The dispersion of the modified silicone compound with a moderate particle size in the paramylon derivative can effectively generate stress concentration around a silicone region having a low elastic modulus to obtain a resin molded body having excellent impact resistance. The total average content of the organic substituents is preferably 0.010% by mass or more, more preferably 0.10% by mass or more, and preferably 70% by mass or less, more preferably 50% by mass or less. The modified silicone compound moderately containing the organic substituents has improved affinity for the paramylon-based resin, so that the modified silicone compound can be dispersed with a moderate particle size in the paramylon derivative, and can further suppress bleed-out ascribable to the separation of the modified silicone compound in a molded product. If the total average content of the organic substituents is too small, dispersion with a moderate particle size in the paramylon-based resin is difficult.

When the organic substituent in the modified polydimethylsiloxane compound is amino group, epoxy group, carbinol group, phenol group, mercapto group, carboxyl group, or methacryl group, the average content of the organic substituents in this modified polydimethylsiloxane compound can be determined according to the following expression (I).

$$\text{Average organic substituent content (\%)} = (\text{Formula weight of the organic substituents}/\text{Organic substituent equivalent}) \times 100 \quad \text{(I)}$$

In the expression (I), the organic substituent equivalent is an average mass of the modified silicone compound per mol of the organic substituents.

When the organic substituents in the modified polydimethylsiloxane compound are phenoxy group, alkylphenoxy group, long chain alkyl group, aralkyl group, long chain fatty acid ester group, or long chain fatty acid amide group, the average content of the organic substituents in this modified polydimethylsiloxane compound can be determined according to the following expression (II).

$$\text{Average organic substituent content (\%)} = x \times w/[(1-x) \times 74 + x \times (59+w)] \times 100 \quad \text{(II)}$$

In the expression (II), x is an average molar fraction of organic substituent-containing siloxane repeat units based on all siloxane repeat units in the modified polydimethylsiloxane compound, and w is the formula weight of the organic substituents.

When the organic substituents in the modified polydimethylsiloxane compound are phenyl group, the average content of the phenyl group in this modified polydimethylsiloxane compound can be determined according to the following expression (III).

$$\text{Average phenyl group content (\%)} = 154 \times x/[74 \times (1-x) + 198 \times x] \times 100 \quad \text{(III)}$$

In the expression (III), x is an average molar fraction of phenyl group-containing siloxane repeat units based on all siloxane repeat units in the modified polydimethylsiloxane compound (A).

When the organic substituents in the modified polydimethylsiloxane compound are polyether group, the average content of the polyether group in this modified polydimethylsiloxane compound can be determined according to the following expression (IV).

$$\text{Average polyether group content (\%)} = \text{HLB value}/20 \times 100 \quad \text{(IV)}$$

In the expression (IV), the HLB value is a value that indicates the degree of affinity of a surfactant for water and an oil, and is defined according to the following expression (V) based on the Griffin method.

HLB value=20×(Sum of formula weights of hydrophilic sites/Molecular weight) (V)

To the paramylon derivative of the present embodiment, two or more of modified silicone compounds differing in affinity for the derivative may be added. In this case, the dispersibility of a modified silicone compound (A1) having relatively low affinity is improved by a modified silicone compound (A2) having relatively high affinity so that a paramylon-based resin composition having much better impact resistance can be obtained. The total average content of the organic substituents in the modified silicone compound (A1) having relatively low affinity is preferably 0.01% by mass or more, more preferably 0.1% by mass or more, and preferably 15% by mass or less, more preferably 10% by mass or less. The total average content of the organic substituents in the modified silicone compound (A2) having relatively high affinity is preferably 15% by mass or more, more preferably 20% by mass or more, and preferably 90% by mass or less.

The blending ratio (mass ratio) between the modified silicone compound (A1) and the modified silicone compound (A2) may be in the range of 10/90 to 90/10.

The modified silicone compound may have dimethylsiloxane repeat units and organic substituent-containing siloxane repeat units such that the same repeat units are continuously connected, or such that these repeat units are alternately connected or randomly connected. The modified silicone compound may have a branched structure.

The number average molecular weight of the modified silicone compound is preferably 900 or larger, more preferably 1000 or larger, and preferably 1000000 or smaller, more preferably 300000 or smaller, further preferably 100000 or smaller. The modified silicone compound having a sufficiently large molecular weight can suppress loss ascribable to volatilization when kneaded with the melted paramylon derivative at the time of paramylon derivative composition production. The modified silicone compound having a molecular weight that is not too large and is moderate has good dispersibility and can yield a homogeneous molded product.

A value (calibrated with a polystyrene standard sample) found in measurement by GPC on a 0.1% solution of the sample in chloroform can be used as the number average molecular weight.

The amount of such a modified silicone compound added is preferably 1% by mass or more, more preferably 2% by mass or more, based on the whole paramylon derivative composition in view of obtaining a sufficient effect of addition. The amount is preferably 20% by mass or less, more preferably 10% by mass or less, in view of sufficiently securing the characteristics, such as strength, of the paramylon-based resin and suppressing bleed-out.

The addition of such a modified silicone compound to the paramylon derivative can disperse the modified silicone compound with a moderate particle size (e.g., 0.1 to 100 m) in the resin and can thus improve the impact resistance of a resin composition.

To the paramylon derivative of the present embodiment, an additive that is applied to usual resin compositions may be added, if necessary, including as a colorant, an antioxidant, and a heat stabilizer.

To the paramylon derivative of the present embodiment, a general thermoplastic resin may added, if necessary.

Polyester may be added as the thermoplastic resin, and linear aliphatic polyester can be suitably used. This linear aliphatic polyester (Y) is preferably the following linear aliphatic polyester (Y1) and/or (Y2), and examples thereof include polybutylene succinate, polybutylene succinate adipate, and polycaprolactone.

(Y1) Linear aliphatic polyester containing repeat units of at least one of the following formulas (21) and (22):

$$—(CO—R^{23}—COO—R^{24}—O—)— \quad (21)$$

$$—(CO—R^{25}—O—)— \quad (22)$$

In the formula (21), $R^{23}$ represents divalent aliphatic group, and the number of carbon atoms thereof is 1 to 12, preferably 2 to 8, more preferably 2 to 4. $R^{24}$ represents divalent aliphatic group, and the number of carbon atoms thereof is 2 to 12, preferably 2 to 8, more preferably 2 to 4.

In the formula (22), $R^{25}$ represents divalent aliphatic group, and the number of carbon atoms thereof is 2 to 10, preferably 2 to 8, more preferably 2 to 4.

(Y2) Linear aliphatic polyester consisting of a ring-opening polymer of cyclic ester.

The linear aliphatic polyester (YT) can be obtained, for example, through the condensation reaction of at least one member selected from the group consisting of aliphatic dicarboxylic acid, acid anhydride thereof and diester thereof with aliphatic diol.

The aliphatic dicarboxylic acid has, for example, 3 to 12 carbon atoms, preferably 3 to 9 carbon atoms, more preferably 3 to 5 carbon atoms. This aliphatic carboxylic acid is, for example, alkanedicarboxylic acid, and specific examples thereof include malonic acid, succinic acid, adipic acid, sebacic acid, azelaic acid, and dodecanedicarboxylic acid. For example, any one of these aliphatic dicarboxylic acids may be used, or two or more thereof may be used in combination.

The aliphatic diol has, for example, 2 to 12 carbon atoms, preferably 2 to 8 carbon atoms, more preferably 2 to 6 carbon atoms. This aliphatic diol is, for example, alkylene glycol, and specific examples thereof include ethylene glycol, 1,3-propylene glycol, 1,4-butanediol, 1,6-hexanediol, 1,9-nonanediol, 1,10-decanediol and 1,12-dodecanediol. Among them, linear aliphatic diol having 2 to 6 carbon atoms is preferred, and ethylene glycol, 1,3-propylene glycol, 1,4-butanediol, or 1,6-hexanediol is particularly preferred. For example, any one of these aliphatic diols may be used, or two or more thereof may be used in combination.

The linear aliphatic polyester (Y2) is linear aliphatic polyester obtained by the ring-opening polymerization of cyclic ester. Examples of this cyclic ester include lactone having 2 to 12 carbon atoms, and specific examples thereof include α-acetolactone, β-propiolactone, γ-butyrolactone and 6-valerolactone. For example, any one of these cyclic esters may be used, or two or more thereof may be used in combination.

The number average molecular weight of the linear aliphatic polyester (Y) is not particularly limited. The number average molecular weight is, for example, preferably 10000 or larger, more preferably 20000 or larger, in terms of the lower limit, and is, for example, preferably 200000 or smaller, more preferably 100000 or smaller, in terms of the upper limit. The aliphatic polyester having a molecular weight in the range has better dispersibility so that a more homogeneous molded body can be obtained.

For example, a value (calibrated with a polystyrene standard sample) found in measurement by GPC on a 0.1% solution of the sample in chloroform can be used as the number average molecular weight.

The impact resistance of the paramylon derivative according to an embodiment of the present invention can be improved by the addition of a thermoplastic resin excellent in flexibility, such as a thermoplastic polyurethane elastomer (TPU). The amount of such a thermoplastic resin (particularly, TPU) added is preferably 1% by mass or more, more preferably 5% by mass or more, based on the whole composition containing the paramylon derivative of the present embodiment in view of obtaining a sufficient effect of addition.

The thermoplastic polyurethane elastomer (TPU) suitable for improvement in impact resistance can be prepared, for use, using polyol, diisocyanate, and a chain extender.

Examples of this polyol include polyester polyol, polyester ether polyol, polycarbonate polyol, and polyether polyol.

Examples of the polyester polyol described above include: polyester polyol obtained through the dehydration condensation reaction of polyvalent carboxylic acid such as aliphatic dicarboxylic acid (succinic acid, adipic acid, sebacic acid, azelaic acid, etc.), aromatic dicarboxylic acid (phthalic acid, terephthalic acid, isophthalic acid, naphthalenedicarboxylic acid, etc.), or alicyclic dicarboxylic acid (hexahydrophthalic acid, hexahydroterephthalic acid, hexahydroisophthalic acid, etc.) or acid ester or acid anhydride thereof with a polyhydric alcohol such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,3-octanediol, or 1,9-nonanediol or a mixture thereof; and polylactone diol obtained by the ring-opening polymerization of a lactone monomer such as $-caprolactone.

Examples of the polyester ether polyol described above include compounds obtained through the dehydration condensation reaction of polyvalent carboxylic acid such as aliphatic dicarboxylic acid (succinic acid, adipic acid, sebacic acid, azelaic acid, etc.), aromatic dicarboxylic acid (phthalic acid, terephthalic acid, isophthalic acid, naphthalenedicarboxylic acid, etc.), or alicyclic dicarboxylic acid (hexahydrophthalic acid, hexahydroterephthalic acid, hexahydroisophthalic acid, etc.) or acid ester or acid anhydride thereof with glycol such as diethylene glycol or alkylene oxide adduct (propylene oxide adduct, etc.) or a mixture thereof.

Examples of the polycarbonate polyol described above include polycarbonate polyol obtained through the reaction of one or two or more polyhydric alcohols such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, or diethylene glycol with diethylene carbonate, dimethyl carbonate, diethyl carbonate, or the like. A copolymer of polycaprolactone polyol (PCL) and polyhexamethylene carbonate (PHL) may be used.

Examples of the polyether polyol described above include polyethylene glycol, polypropylene glycol, and polytetramethylene ether glycol obtained by the polymerization of cyclic ether such as ethylene oxide, propylene oxide, and tetrahydrofuran, respectively, and copolyether thereof.

Examples of the diisocyanate for use in the formation of TPU include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethylxylene diisocyanate (TMXDI), 1,6,11-undecane triisocyanate, 1,8-diiisocyanatomethyloctane, lysine ester triisocyanate, 1,3,6-hexamethylene triisocyanate, bicycloheptane triisocyanate, and dicyclohexylmethane diisocyanate (hydrogenated MDI; HMDI). Among them, 4,4'-diphenylmethane diisocyanate (MDI) and 1,6-hexamethylene diisocyanate (HDI) can be suitably used.

Low-molecular-weight polyol can be used as the chain extender for use in the formation of TPU. Examples of this low-molecular-weight polyol include: aliphatic polyol such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, 1,4-cyclohexanedimethanol, and glycerin; and aromatic glycol such as 1,4-dimethylolbenzene, bisphenol A, and ethylene oxide or propylene oxide adduct of bisphenol A.

The thermoplastic polyurethane elastomer (TPU) obtained from such a material can be copolymerized with the silicone compound to obtain much better impact resistance.

These thermoplastic polyurethane elastomers (TPUs) may be used each singly or may be used in combination.

A method for producing a resin composition including the paramylon derivative according to an embodiment of the present invention and various additives or a thermoplastic resin added thereto is not particularly limited, and the resin composition can be produced, for example, by hand mixing or melt-mixing various additives and the paramylon-based resin using a mixing machine known in the art, for example, a compounding apparatus such as a tumbler mixer, a ribbon blender, a single-screw or multi-screw mixing extruder, a kneader, or a kneading roll, and performing, if necessary, granulation or the like into an appropriate shape. Another suitable production method is a production method including mixing various additives and the resin dispersed in a solvent such as an organic solvent, further adding, if necessary, a solvent for coagulation thereto to obtain a mixed composition of the various additives and the resin, and then evaporating the solvent.

The paramylon-based resin according to any of the embodiments described above can be used as a base resin for a molding material (resin composition). The molding material obtained by using the paramylon-based resin as a base resin is suitable for a molded body such as a housing such as an exterior for electronics.

In this context, the base resin means a main component in a molding material and means that the containment of other components without hindering the functions of this main component is accepted. It is encompassed that this main component accounts for 50% by mass or more, preferably 70% by mass or more, more preferably 80% by mass or more, particularly preferably 90% by mass or more, in the composition, but the content of this main component is not particularly limited thereto.

EXAMPLES

Hereinafter, the present invention will be further specifically described with reference to specific examples.

Measurement methods performed in Examples and Comparative Examples are as described below.

[Measurement of Weight Average Molecular Weight and Number Average Molecular Weight]

The weight average molecular weight and the number average molecular weight of paramylon were determined by GPC under conditions given below. The measurement results are shown in Table 1.

(GPC Measurement Conditions for Paramylon)

Column: PLgel 20 m MIXED-A (product name, manufactured by Agilent Technologies Japan, Ltd.)

Eluent: Dimethylacetamide (DMAc) solution (0.1 M LiCl)

Flow rate: 0.5 mL/min

Detector: RI (differential refractive index) (RI-71 model 201 (16×) manufactured by Tosoh Corp.)

Temperature: 23.0° C.

Standard sample: Pullulan standard

[Measurement of Protein Content of Paramylon]

A 6 mol/L aqueous hydrochloric acid solution was added to paramylon, followed by hydrolysis at 110° C. for 24 hours, and then the solution was removed with an evaporator. The resultant was dissolved in a 0.02 mol/L aqueous hydrochloric acid solution, and the solution was filtered through a 0.22 μm filter. Amino acids were quantified by the post-column ninhydrin derivatization method (JEOL JLC-500/V2 Amino Acid Analyzer). The total amount of the amino acids was regarded as a protein content.

[Measurement of Pigment Content of Paramylon]

Paramylon was dispersed in acetone, and the resultant was left standing overnight, and filtered. The resulting filtrate was applied to an ultraviolet-visible spectrophotometer (UV-1800, Shimadzu Corp.) to measure the absorbance of chlorophyll a. The amount of chlorophyll a was calculated according to the calculation expression of the Unesco method.

$$\text{Total chlorophyll } a[\mu g/mL]=1.64*E663-2.16*E645+0.10*E630$$

(E663, E645, and E630 are values obtained by subtracting the absorbance at 750 nm from absorbance at 663, 645, and 630 nm, respectively.)

Example 1

[Recovery and Purification of Paramylon from *Euglena* (Photosynthetically Cultured)]

A *Euglena* alga body was photosynthetically cultured, then flocculated-precipitated with magnesium sulfate and sodium hydroxide, and suction-filtered to obtain 1340 g of a *Euglena* paste containing the flocculant (magnesium hydroxide). Next, 1340 g of a 10 mass % aqueous sulfuric acid solution was added to the *Euglena* paste, and the mixture was stirred at room temperature for 3 hours and then suction-filtered. An operation of further adding 1340 g of water thereto and stirring the mixture at room temperature for 30 minutes, followed by suction filtration was repeated three times to obtain 288 g of a *Euglena* alga body (mixture of 188 g of a dry alga body and 100 g of water). To this *Euglena* alga body, 900 mL of chloroform and 450 mL of methanol were added, and the mixture was left standing overnight at room temperature, then stirred at 40° C. for 3 hours, and filtered. Then, an operation of adding 450 mL of chloroform and 225 mL of methanol to this filtered material, and filtering the mixture after 30 minutes at room temperature was repeated twice to separate a solvent-soluble component (containing pigments and lipids) and solid matter (containing mixtures of paramylon and proteins) (separation step). To 162 g of this solid matter, 1620 g of a 2 mass % aqueous sodium dodecyl sulfate (SDS) solution was added, and the mixture was heated to 90° C. and stirred for 30 minutes. After cooling, the solution was centrifuged for solid-liquid separation to isolate solid matter. Then, 1620 g of a 1 mass % aqueous SDS solution of was added to the solid matter, and the mixture was heated to 90° C. and then stirred for 30 minutes. After cooling, solid-liquid separation was performed by centrifugation to isolate solid matter, to which 810 g of water was then added, and the mixture was stirred at room temperature for 30 minutes to wash off SDS. The operation of washing with water was repeated three times. The amount of the paramylon A obtained was 104 g and the paramylon A had a weight average molecular weight of 245000 and a protein content of 13% by mass.

[Molecular Weight Adjustment of Paramylon (Acid Degradation)]

15 g of the paramylon A and 150 g of a 10% aqueous hydrochloric acid solution were placed in a reactor, stirred at 90° C. for 4 hours, and then washed with water to obtain paramylon 1. The paramylon 1 had a weight average molecular weight (Mw) of 152000, a protein content of 0.28% by mass, and a pigment content of 0 μg/g. The paramylon was further acylated in a solid-liquid heterogeneous system to obtain a paramylon-based resin. Specifically, a paramylon-based resin (paramylon propionate stearate) was prepared in accordance with the description below.

[Synthesis of Paramylon-Based Resin]

4.5 g (on dry basis, 27.8 mmol/glucose unit) of the paramylon 1 was placed in a reactor, dispersed in a mixed solution of 51.4 mL of N-methylpyrrolidone and 7.1 mL of pyridine in a nitrogen atmosphere, and activated by stirring overnight at room temperature.

Then, the dispersion of the paramylon 1 was cooled to 10° C. or lower, and 1.68 g (5.6 mmol) of stearoyl chloride and 6.16 g (66.6 mmol) of propionyl chloride mixed in advance were added to the reactor while the temperature was kept at 10° C. or lower.

The reaction mixture was stirred while heated at 90° C. for 4 hours, and then cooled to 65° C., and 58 mL of methanol was added dropwise thereto, followed by stirring for approximately 30 minutes.

The product was further deposited by the addition of 13 mL of water and recovered by suction filtration. The obtained solid matter was washed with 54 mL of a methanol/water mixed solution (9/1 v/v) until the color of the filtrate disappeared (5 times).

The washed solid matter was dried in vacuum at 105° C. for 5 hours to obtain 8.7 g of a powdery paramylon-based resin (paramylon propionate stearate).

The obtained paramylon-based resin (paramylon propionate stearate) was analyzed by $^1$H-NMR (manufactured by Bruker, AV-400, 400 MHz, solvent: $CDCl_3$) and as a result, found to have $DS_{Lo}$ of 0.20 and $DS_{Sh}$ of 2.0.

This paramylon-based resin was also evaluated in accordance with the description below. The results are shown in Table 1.

[Measurement of Glass Transition Temperature (Tg)]

The glass transition temperature was measured by differential scanning calorimetry (DSC) under conditions given below. The measurement apparatus used was EXSTAR2000, DSC6200 from Seiko Instruments Inc. The paramylon-based resin was heated from 20° C. to 200° C. at 10° C./min and then quenched from 200° C. to −30° C. at 50° C./min. Then, the paramylon-based resin was warmed from −30° C. to 200° C. at 20° C./min, and the glass transition temperature (Tg) at that time was measured.

[Preparation of Injection-Molded Body]

A molded body having the following shape was prepared from the sample obtained above by use of injection molding (manufactured by Thermo Electron Corporation, HAAKE MiniJet II).

Molded body size: 2.4 mm in thickness, 12.4 mm in width, and 80 mm in length

In this respect, molding conditions were as follows: the cylinder temperature of the molding machine was 200° C., the mold temperature was 65° C., the injection pressure was 1200 bar (120 MPa) for 5 seconds, and the pressure was kept at 600 bar (60 MPa) for 20 seconds.

[Measurement of Flexural Strength, Flexural Modulus, and Flexural Strain at Break]

The obtained molded body was subjected to a flexural test in accordance with JIS K7171 to measure flexural strength, flexural modulus, and flexural strain at break.

[Measurement of Fluidity (Melt Flow Rate (MFR))]

The MFR was measured using a Koka flow tester (manufactured by Shimadzu Corp., product name: CFT-500D) under following conditions: a temperature of 230° C., a load of 20 kg, a die of 2 mmϕ×10 mm (hole diameter: 2 mm, hole length: 10 mm), and preheat for 2 minutes (time from the injection of a piston into a cylinder filled with the sample to the application of load) based on JIS7210: 1990.

[Appearance of Molded Body]

The appearance of the obtained molded body was visually observed and evaluated according to the following criteria.

○: The molded body was light brown and transparent, and no poor molding was observed.

x: The molded body was black and opaque, or poor molding (weld occurred on the molded body surface) was observed.

Example 2

15 g of the paramylon A and 150 g of a 5% aqueous hydrochloric acid solution were placed in a reactor, stirred at 90° C. for 7 hours, and then washed with water to obtain paramylon 2. The paramylon 2 had a weight average molecular weight (Mw) of 180000, a protein content of 2.8% by mass, and a pigment content of 2.89 μg/g. Further, a paramylon-based resin (paramylon propionate stearate) was prepared (yield: 8.0 g) in accordance with the same quantities and method as in Example 1 except that the paramylon 1 was changed to the paramylon 2.

The obtained paramylon-based resin (paramylon propionate stearate) was analyzed by $^1$H-NMR in the same manner as in Example 1 and as a result, found to have $DS_{Lo}$ of 0.20 and $DS_{Sh}$ of 2.0.

This paramylon-based resin was also evaluated for flexural strength, etc., Tg, fluidity, and the appearance of a molded body in accordance with the same methods as in Example 1. The results are shown in Table 1.

Example 3

15 g of the paramylon A and 150 g of a 5% aqueous hydrochloric acid solution were placed in a reactor, stirred at 90° C. for 4 hours, and then washed with water to obtain paramylon 3. The paramylon 3 had a weight average molecular weight (Mw) of 196000, a protein content of 4.8% by mass, and a pigment content of 0 μg/g. Further, a paramylon-based resin (paramylon propionate stearate) was prepared (yield: 8.1 g) in accordance with the same quantities and method as in Example 1 except that the paramylon 1 was changed to the paramylon 3.

The obtained paramylon-based resin (paramylon propionate stearate) was analyzed by $^1$H-NMR in the same manner as in Example 1 and as a result, found to have $DS_{Lo}$ of 0.20 and $DS_{Sh}$ of 2.0.

This paramylon-based resin was also evaluated for flexural strength, etc., Tg, fluidity, and the appearance of a molded body in accordance with the same methods as in Example 1. The results are shown in Table 1.

Example 4

15 g of the paramylon A and 150 g of a 3% aqueous hydrochloric acid solution were placed in a reactor, stirred at 90° C. for 7 hours, and then washed with water to obtain paramylon 4. The paramylon 4 had a weight average molecular weight (Mw) of 214000, a protein content of 1.9% by mass, and a pigment content of 13.1 μg/g. Further, a paramylon-based resin (paramylon propionate stearate) was prepared (yield: 8.1 g) in accordance with the same quantities and method as in Example 1 except that the paramylon 1 was changed to the paramylon 4.

The obtained paramylon-based resin (paramylon propionate stearate) was analyzed by $^1$H-NMR in the same manner as in Example 1 and as a result, found to have $DS_{Lo}$ of 0.19 and $DS_{Sh}$ of 2.2.

This sample was also evaluated for flexural strength, etc., Tg, fluidity, and the appearance of a molded body in accordance with the same methods as in Example 1. The results are shown in Table 1.

Example 5

15 g of the paramylon A and 150 g of a 5% aqueous hydrochloric acid solution were placed in a reactor, stirred at 90° C. for 5 hours, and then washed with water to obtain paramylon 8. The paramylon 8 had a weight average molecular weight (Mw) of 164000 (number average molecular weight: 36600, molecular weight distribution: 4.5), a protein content of 4.3% by mass, and a pigment content of 7.9 μg/g.

10.0 g (on dry basis, 61.7 mmol/glucose unit) of the paramylon 8 was further placed in a reactor, dispersed in a mixed solution of 131.7 mL of N-methylpyrrolidone and 18.3 mL of pyridine in a nitrogen atmosphere, and activated by stirring overnight at room temperature.

Then, the dispersion of the paramylon 8 was cooled to 10° C. or lower, and 17.12 g (185.0 mmol) of propionyl chloride was added to the reactor while the temperature was kept at 10° C. or lower.

The reaction mixture was stirred while heated at 90° C. for 4 hours, and then cooled to 65° C., and 150 mL of methanol was added dropwise thereto, followed by stirring for approximately 30 minutes.

The product was further deposited by the addition of 33 mL of water and recovered by suction filtration. The obtained solid matter was washed with 99 mL of a methanol/water mixed solution (9/1 v/v) until the color of the filtrate disappeared (5 times).

The washed solid matter was dried in vacuum at 105° C. for 5 hours to obtain 17 g of a powdery paramylon-based resin (paramylon propionate).

The obtained paramylon-based resin (paramylon propionate) was analyzed by $^1$H-NMR in the same manner as in Example 1 and as a result, found to have $DS_{Sh}$ of 2.6.

This paramylon-based resin was also evaluated for flexural strength, etc., Tg, fluidity, and the appearance of a molded body in accordance with the same methods as in Example 1. The results are shown in Table 1.

Comparative Example 1

A *Euglena* alga body was photosynthetically cultured (cultured in a lot different from that of Example 1), then flocculated-precipitated with magnesium sulfate and sodium hydroxide, and suction-filtered to obtain 424 g of a *Euglena* paste containing the flocculant (magnesium hydroxide). Next, 241 g of a 10 mass % aqueous sulfuric acid solution was added to the *Euglena* paste, and the mixture was stirred at room temperature for 3 hours and then suction-filtered. An operation of further adding 241 g of water thereto and stirring the mixture at room temperature for 30 minutes, followed by suction filtration was repeated three times to obtain 127 g of a *Euglena* alga body (mixture of 69 g of a dry alga body and 58 g of water). To this *Euglena* alga body, 330 mL of chloroform and 165 mL of methanol were added, and the mixture was left standing overnight at room temperature, then stirred at 40° C. for 3 hours, and filtered. Then, an operation of adding 165 mL of chloroform and 83 mL of methanol to this filtered material, and filtering the mixture after 30 minutes at room temperature was repeated twice to separate a solvent-soluble component (containing pigments and lipids) and solid matter (containing mixtures of paramylon and proteins) (separation step). To 60 g of this solid matter, 600 g of a 5 mass % aqueous sodium dodecyl sulfate (SDS) solution was added, and the mixture was heated to 90° C. and stirred for 30 minutes. After cooling, the solution was centrifuged for solid-liquid separation to isolate solid matter, and treatment using a 5 mass % aqueous SDS solution was further repeated twice in the same manner as above. After cooling, the solution was centrifuged for solid-liquid separation. 600 g of a 1 mass % aqueous SDS solution was added to the obtained solid matter, and the mixture was heated to 90° C. and then stirred for 30 minutes. After cooling, solid-liquid separation was performed by centrifugation to isolate solid matter, to which 600 g of water was then added, and the mixture was stirred at room temperature for 30 minutes to wash off SDS. The operation of washing with water was repeated three times to obtain paramylon B. The amount of paramylon B obtained was 42 g and the paramylon B had a weight average molecular weight of 245000 and a protein content of 20% by mass.

15 g of the paramylon B and 150 g of a 5% aqueous hydrochloric acid solution were placed in a reactor, stirred at 90° C. for 4 hours, and then washed with water to obtain paramylon 5. The paramylon 5 had a weight average molecular weight (Mw) of 191000, a protein content of 7.9% by mass, and a pigment content of 436 μg/g. Further, a paramylon-based resin (paramylon propionate stearate) was prepared (yield: 7.9 g) in accordance with the same quantities and method as in Example 1 except that the paramylon 1 was changed to the paramylon 5.

The obtained paramylon-based resin (paramylon propionate stearate) was analyzed by $^1$H-NMR in the same manner as in Example 1 and as a result, found to have $DS_{Lo}$ of 0.24 and $DS_{Sh}$ of 2.1.

This paramylon-based resin was also evaluated for flexural strength, etc., Tg, fluidity, and the appearance of a molded body in accordance with the same methods as in Example 1. The results are shown in Table 1.

Comparative Example 2

A paramylon-based resin (paramylon propionate stearate) was prepared (yield: 7.1 g) in accordance with the same quantities and method as in Example 1, except that the paramylon 1 was changed to the paramylon 5 and that the amount of stearoyl chloride used was changed to 0.84 g (2.8 mmol).

The obtained paramylon-based resin (paramylon propionate stearate) was analyzed by $^1$H-NMR in the same manner as in Example 1 and as a result, found to have $DS_{Lo}$ of 0.12 and $DS_{Sh}$ of 2.1.

This paramylon-based resin was also evaluated for flexural strength, etc., Tg, fluidity, and the appearance of a molded body in accordance with the same methods as in Example 1. The results are shown in Table 1.

Comparative Example 3

*Euglena* cultured in a lot different from that of Comparative Example 1 was used, and paramylon was recovered from the *Euglena* in the same manner as in Comparative Example 1 to obtain paramylon C. The obtained paramylon C had a weight average molecular weight of 245000 and a protein content of 30% by mass.

15 g of the paramylon C and 150 g of a 5% aqueous hydrochloric acid solution were placed in a reactor, stirred at 90° C. for 4 hours, and then washed with water to obtain paramylon 6. The paramylon 6 had a weight average molecular weight (Mw) of 236000, a protein content of 11.6% by mass, and a pigment content of 44.3 μg/g. Further, a paramylon-based resin (paramylon propionate stearate) was prepared (yield: 8.2 g) in accordance with the same quantities and method as in Example 1 except that the starting material was changed to the paramylon 6.

The obtained paramylon-based resin (paramylon propionate stearate) was analyzed by $^1$H-NMR in the same manner as in Example 1 and as a result, found to have $DS_{Lo}$ of 0.19 and $DS_{Sh}$ of 2.2. This paramylon-based resin was also evaluated for flexural strength, etc., Tg, fluidity, and the appearance of a molded body in accordance with the same methods as in Example 1. The results are shown in Table 1.

Comparative Example 4

[Recovery of Paramylon from *Euglena* (Heterotrophically Cultured)]

A *Euglena* alga body was heterotrophically cultured and then centrifuged to obtain 16.1 kg (9.23 kg of a dry alga body) of a *Euglena* paste. Next, 92 L of acetone was added to the *Euglena* paste, and the mixture was left standing overnight at room temperature and then filtered to separate a solvent-soluble component (pigments and lipids) and solid matter (mixtures of paramylon and proteins). To 9.34 kg of this solid matter, 92.2 kg of a 1 mass % aqueous sodium dodecyl sulfate (SDS) solution was added, and the mixture was heated to 90° C. and stirred for 30 minutes. After cooling, the solution was centrifuged for solid-liquid separation to isolate solid matter, to which 92.2 kg of a 0.1 mass % aqueous SDD solution was then added, and the mixture was heated to 90° C. and then stirred for 30 minutes. After cooling, solid-liquid separation was performed by centrifugation to isolate solid matter, to which 92.2 kg of water was then added, and the mixture was stirred at room temperature for 30 minutes to wash off SDS. The operation of washing with water was repeated three times. The amount of the paramylon D obtained was 5.94 kg and the paramylon D had a weight average molecular weight of 242000 and a protein content of 0.9% by mass.

A paramylon-based resin (paramylon propionate stearate) was prepared (yield: 6.8 g) in accordance with the same quantities and method as in Example 1 except that the paramylon 1 was changed to the paramylon D. The obtained sample (paramylon propionate stearate) was analyzed by $^1$H-NMR in the same manner as in Example 1 and as a result, found to have $DS_{Lo}$ of 0.26 and $DS_{Sh}$ of 1.5.

This sample was also evaluated for flexural strength, etc., Tg, fluidity, and the appearance of a molded body in accordance with the same methods as in Example 1. The results are shown in Table 1.

Comparative Example 5

15 g of the paramylon D of Comparative Example 4 and 150 g of a 1% aqueous hydrochloric acid solution were placed in a reactor, stirred at 100° C. for 4 hours, and then washed with water to obtain paramylon 7. The paramylon 7 had a weight average molecular weight (Mw) of 202,000, a protein content of 0.20% by mass, and a pigment content of 0 μg/g. Further, a paramylon-based resin (paramylon propionate stearate) was prepared (yield: 8.0 g) in accordance with the same quantities and method as in Example 1 except that the paramylon 1 was changed to the paramylon 7.

The obtained paramylon-based resin (paramylon propionate stearate) was analyzed by $^1$H-NMR in the same manner as in Example 1 and as a result, found to have $DS_{Lo}$ of 0.20 and $DS_{Sh}$ of 2.1.

This paramylon-based resin was also evaluated for flexural strength, etc., Tg, fluidity, and the appearance of a molded body in accordance with the same methods as in Example 1. The results are shown in Table 1.

Table 1 shows the characteristic of each produced paramylon, the long chain component (octadecanoyl group (corresponding to the acyl group moiety of stearic acid)), the short chain component (propionyl group) and the degree of substitution of each paramylon-based resin (paramylon propionate stearate), and the evaluation results about flexural strength, glass transition temperature, fluidity, and the appearance of a molded body.

TABLE 1

| | paramylon | | | | | | | paramylon-based resin Degree of substitution | | | | | | | |
|---|---|---|---|---|---|---|---|---|---|---|---|---|---|---|---|
| | Paramylon type | Presence or absence of acid degradation | Protein content (% by mass) | Pigment (μg/g) | Molecular weight Mn ×10$^4$ | Molecular weight Mw ×10$^4$ | Mw/Mn | long chain DS Lo | short chain DS Sh | Flexural strength (MPa) | Flexural modulus (GPa) | Flexural strain at break (%) | Tg (° C.) | MFR 230° C. 20 kgf (g/10 min) | Appearance of molded body |
| Ex. 1 | 1 | present | 0.28 | 0 | 5.52 | 15.2 | 2.8 | 0.20 | 2.0 | 50 | 1.3 | >10 | 98 | 7.2 | ○ |
| Ex. 2 | 2 | present | 2.8 | 2.89 | 3.77 | 18.0 | 4.8 | 0.20 | 2.0 | 52 | 1.4 | >10 | 98 | 24 | ○ |
| Ex. 3 | 3 | present | 4.8 | 0 | 3.26 | 19.6 | 6 | 0.20 | 2.0 | 54 | 1.4 | >10 | 102 | 50 | ○ |
| Ex. 4 | 4 | present | 1.9 | 13.1 | 5.09 | 21.4 | 4.2 | 0.19 | 2.2 | 50 | 1.3 | >10 | 98 | 29 | ○ |
| Ex. 5 | 8 | present | 4.3 | 7.9 | 3.66 | 16.4 | 4.5 | 0 | 2.6 | 67 | 1.5 | >10 | 118 | 115 | ○ |
| Com. Ex. 1 | 5 | present | 7.9 | 436 | 2.23 | 19.1 | 8.6 | 0.24 | 2.1 | 48 | 1.1 | >10 | 90 | >100 | x black and opaque |
| Com. Ex. 2 | 5 | present | 7.9 | 436 | 2.23 | 19.1 | 8.6 | 0.12 | 2.1 | 35 | 1.1 | 2.3 | 100 | >100 | x black and opaque |
| Com. Ex. 3 | 6 | present | 11.6 | 44.3 | 2.71 | 23.6 | 8.7 | 0.19 | 2.2 | 52 | 1.4 | >10 | 90 | >100 | x black and opaque |
| Com. Ex. 4 | D | absent | 0.9 | 0 | 7.26 | 24.2 | 3.3 | 0.26 | 1.5 | 49 | 1.3 | 4.6 | 134 | 2.1 | x poor molding |
| Com. Ex. 5 | 7 | present | 0.20 | 0 | 6.2 | 20.2 | 3.3 | 0.20 | 2.1 | 51 | 1.2 | 6.4 | 98 | 4.1 | x poor molding |

Ex. = Example
Com. Ex. = Comparative Example

As shown in Table 1, it is evident that all the paramylon-based resins of Examples according to an embodiment of the present invention were excellent in mechanical characteristics (flexural strength and heat resistance) and thermoplasticity (fluidity), and the appearance of the molded body.

On the other hand, as shown in Comparative Examples 1 and 3, the glass transition temperatures of the paramylon-based resins obtained by using paramylon having a protein content of larger than 5% by mass were decreased even if the degree of substitution (DS) was almost the same as in Examples. This is presumably because proteins function as plasticizer components. As shown in Comparative Examples 1 to 3, when paramylon had too large a protein content and a pigment content, the molded body lost transparency and was stained black. The product of Comparative Example 4 prepared by using paramylon having a weight average molecular weight outside the range of more than 140000 to 220000 had high heterogeneity and poor impact strength and also had insufficient thermoplasticity, causing poor molding (weld occurred on the molded body surface). In Comparative Example 5, paramylon having a protein content as small as 0.20% by mass reduced thermoplasticity and caused flexural strain at break and poor molding, though the weight average molecular weight fell within the range of more than 140000 to 220000.

While the invention has been described with reference to example embodiments and examples thereof, the invention is not limited to these embodiments and examples. Various changes that can be understood by those of ordinary skill in the art may be made to forms and details of the present invention without departing from the spirit and scope of the present invention.

The whole or part of the example embodiments disclosed above can be described as, but not limited to, the following supplementary notes.

(Supplementary Note 1)

A paramylon-based resin in which hydrogen atoms of hydroxy groups of paramylon are substituted by linear saturated aliphatic acyl group having 14 or more carbon atoms as a long chain component and/or acyl group having 2 or 3 carbon atoms (acetyl group or/and propionyl group) as a short chain component, wherein the paramylon has a weight average molecular weight in the range of more than 140000 to 220000 and a molecular weight distribution (weight average molecular weight/number average molecular weight) of 6.5 or less, a protein content of the paramylon is 0.22% by mass to 5.0% by mass, and a degree of substitution ($DS_{Lo}$) by the long chain component and a degree of substitution ($DS_{Sh}$) by the short chain component satisfy the following expressions (S1), (L1) and (T1):

$$1.7 \leq DS_{Sh} \leq 2.8 \quad (S1)$$

$$0 \leq DS_{Lo} \leq 0.4 \quad (L1)$$

$$2.1 \leq DS_{Lo} + DS_{Sh} \leq 2.8 \quad (T1)$$

(Supplementary Note 2)

The paramylon-based resin according to Supplementary note 1, wherein the following expressions (S2) and (L2) are satisfied:

$$1.7 \leq DS_{Sh} < 2.8 \quad (S2)$$

$$0 < DS_{Lo} \leq 0.4 \quad (L2)$$

(Supplementary Note 3)

The paramylon-based resin according to Supplementary note 1 or 2, wherein the following expressions (S3) and (L3) are satisfied:

$$1.9 \leq DS_{Sh} \leq 2.4 \quad (S3)$$

$$0.18 \leq DS_{Lo} \leq 0.4 \quad (L3)$$

(Supplementary Note 4)

The paramylon-based resin according to Supplementary note 1, wherein the following expressions (S4) and (L4) are satisfied:

$$2.1 \leq DS_{Sh} \leq 2.8 \quad (S4)$$

$$DS_{Lo} = 0 \quad (L4)$$

(Supplementary Note 5) The paramylon-based resin according to any one of Supplementary notes 1 to 3, wherein the following expression (T2) is further satisfied:

$$5 \leq DS_{Sh}/DS_{Lo} \leq 25 \quad (T2)$$

(Supplementary Note 6)

The paramylon-based resin according to any one of Supplementary notes 1 to 5, wherein a content of a pigment in the paramylon is 20 μg/g or less.

(Supplementary Note 7)

The paramylon-based resin according to any one of Supplementary notes 1 to 3, 5 and 6, wherein the long chain component is an acyl group moiety of at least one fatty acid selected from the group consisting of myristic acid, palmitic acid, stearic acid, arachidic acid, and behenic acid.

(Supplementary Note 8)

A molding material comprising a paramylon-based resin according to any one of Supplementary notes 1 to 7.

(Supplementary Note 9)

A molded body formed by using a molding material according to Supplementary note 8.

(Supplementary Note 10)

A method for producing a paramylon-based resin according to any one of Supplementary notes 1 to 7, comprising:

a separation step of treating a cultured alga with an organic solvent to obtain solid matter containing paramylon as a component insoluble in the organic solvent;

a surfactant treatment step of treating the solid matter with a surfactant to obtain first paramylon;

a hydrolysis step of hydrolyzing the first paramylon with an acid or an alkali to obtain second paramylon; and an acylation step of acylating hydroxy group of the second paramylon, wherein the second paramylon has a weight average molecular weight in the range of more than 140000 to 220000 and a molecular weight distribution (weight average molecular weight/number average molecular weight) of 6.5 or less, and a protein content of the second paramylon is 0.22% by mass to 5.0% by mass.

(Supplementary Note 11)

The method for producing the paramylon-based resin according to Supplementary note 10, wherein in the acylation step, the hydroxy group of the second paramylon is acylated by reacting the second paramylon dispersed in a solvent with acetyl chloride or/and propionyl chloride under warming in the presence of an acid scavenging component.

(Supplementary Note 12)

The method for producing the paramylon-based resin according to Supplementary note 10, wherein in the acylation step, the hydroxy group of the second paramylon is acylated by reacting the second paramylon dispersed in a solvent with acetyl chloride or/and propionyl chloride and a long chain reactant which is acid chloride of a long chain fatty acid having linear saturated aliphatic acyl group having 14 or more carbon atoms as a long chain component under warming in the presence of an acid scavenging component.

(Supplementary Note 13)

The method for producing the paramylon-based resin according to Supplementary note 11 or 12, wherein the solvent is at least one member selected from water, acetic acid, dioxane, pyridine, N-methylpyrrolidone, N,N-dimethylacetamide, N,N-dimethylformamide, and dimethyl sulfoxide.

(Supplementary Note 14)

The method for producing the paramylon-based resin according to any one of Supplementary notes 11 to 13, wherein the acid scavenging component comprises triethylamine or pyridine.

(Supplementary Note 15)

The method for producing the paramylon-based resin according to any one of Supplementary notes 11 to 14, wherein an amount of the solvent is 10 to 50 times larger than a dry mass of the second paramylon.

This application is based upon and claims the benefit of priority from Japanese patent application No. 2020-82878, filed on May 8, 2020, the disclosure of which is incorporated herein in its entirety by reference.

While the invention has been described with reference to example embodiments and examples thereof, the invention is not limited to these embodiments and examples. Various changes that can be understood by those of ordinary skill in the art may be made to forms and details of the present invention without departing from the spirit and scope of the present invention.

The invention claimed is:

1. A paramylon-based resin in which hydrogen atoms of hydroxy groups of paramylon are substituted by linear saturated aliphatic acyl group having 14 or more carbon atoms as a long chain component and/or acetyl group and/or propionyl group as a short chain component, wherein the paramylon has a weight average molecular weight in the range of more than 140000 to 220000 and a molecular weight distribution (weight average molecular weight/number average molecular weight) of 6.5 or less, a protein content of the paramylon is 0.22% by mass to 5.0% by mass, and a degree of substitution ($DS_{Lo}$) by the long chain component and a degree of substitution ($DS_{Sh}$) by the short chain component satisfy the following expressions (S1), (L1) and (T1):

$$1.7 \leq DS_{Sh} \leq 2.8 \quad (S1)$$

$$0 \leq DS_{Lo} \leq 0.4 \quad (L1)$$

$$2.1 \leq DS_{Lo} + DS_{Sh} \leq 2.8 \quad (T1).$$

2. The paramylon-based resin according to claim 1, wherein the following expressions (S2) and (L2) are satisfied:

$$1.7 \leq DS_{Sh} < 2.8 \quad (S2)$$

$$0 < DS_{Lo} \leq 0.4 \quad (L2).$$

3. The paramylon-based resin according to claim 1, wherein the following expressions (S3) and (L3) are satisfied:

$$1.9 \leq DS_{Sh} \leq 2.4 \quad (S3)$$

$$0.18 \leq DS_{Lo} \leq 0.4 \quad (L3).$$

4. The paramylon-based resin according to claim 1, wherein the following expressions (S4) and (L4) are satisfied:

$$2.1 \leq DS_{Sh} \leq 2.8 \quad (S4)$$

$$DS_{Lo} = 0 \quad (L4).$$

5. The paramylon-based resin according to claim 1, wherein the following expression (T2) is further satisfied:

$$5 \leq DS_{sh}/DS_{Lo} \leq 25 \quad (T2).$$

6. The paramylon-based resin according to claim 1, wherein a content of a pigment in the paramylon is 20 μg/g or less.

7. The paramylon-based resin according to claim 1, wherein the long chain component is an acyl group moiety of at least one fatty acid selected from the group consisting of myristic acid, palmitic acid, stearic acid, arachidic acid, and behenic acid.

8. A molding material comprising the paramylon-based resin according to claim 1.

9. A molded body formed by using the molding material according to claim 8.

10. A method for producing the paramylon-based resin according to claim 1, comprising:

treating a cultured alga with an organic solvent to separate and obtain solid matter comprising paramylon as a component insoluble in the organic solvent;

treating the solid matter with a surfactant to obtain first paramylon;

hydrolyzing the first paramylon with an acid or an alkali to obtain second paramylon; and acylating a hydroxy group of the second paramylon, wherein the second paramylon has a weight average molecular weight in the range of more than 140000 to 220000 and a molecular weight distribution (weight average molecular weight/number average molecular weight) of 6.5 or less, and a protein content of the second paramylon is 0.22% by mass to 5.0% by mass.

11. The method for producing the paramylon-based resin according to claim 10, wherein in acylating a hydroxy group of the second paramylon, the hydroxy group of the second paramylon is acylated by reacting the second paramylon dispersed in a solvent with acetyl chloride and/or propionyl chloride under warming in the presence of an acid scavenging component.

12. The method for producing the paramylon-based resin according to claim 10, wherein in acylating a hydroxy group of the second paramylon, the hydroxy group of the second paramylon is acylated by reacting the second paramylon dispersed in a solvent with acetyl chloride and/or propionyl chloride and a long chain reactant which is acid chloride of a long chain fatty acid having linear saturated aliphatic acyl group having 14 or more carbon atoms as a long chain component under warming in the presence of an acid scavenging component.

13. The method for producing the paramylon-based resin according to claim 11, wherein the solvent is at least one member selected from water, acetic acid, dioxane, pyridine, N-methylpyrrolidone, N,N-dimethylacetamide, N,N-dimethylformamide, and dimethyl sulfoxide.

14. The method for producing the paramylon-based resin according to claim 11, wherein the acid scavenging component comprises triethylamine or pyridine.

15. The method for producing the paramylon-based resin according to claim 11, wherein an amount of the solvent is 10 to 50 times larger than a dry mass of the second paramylon.

* * * * *